United States Patent [19]

Sambayashi et al.

[11] Patent Number: 5,016,052
[45] Date of Patent: May 14, 1991

[54] READER/PRINTER DEVICE WITH POWER SAVER FUNCTION AND PRINT NUMBER RESET

[75] Inventors: Takeshi Sambayashi, Tokyo; Hideshi Oushiden, Kawasaki; Hiroaki Takaoka; Kazushige Morihara, both of Tokyo, all of Japan

[73] Assignee: Kabushiki Kaisha Toshiba, Kawasaki, Japan

[21] Appl. No.: 433,427

[22] Filed: Nov. 7, 1989

Related U.S. Application Data

[63] Continuation of Ser. No. 312,309, Feb. 17, 1989, abandoned, which is a continuation of Ser. No. 905,563, Sep. 10, 1986, abandoned.

[30] Foreign Application Priority Data

Sep. 10, 1985 [JP] Japan ................. 60-202310
Sep. 20, 1985 [JP] Japan ................. 60-209503
Oct. 31, 1985 [JP] Japan ................. 60-245064

[51] Int. Cl.⁵ ........................................ G03G 15/00
[52] U.S. Cl. ........................... 355/228; 355/285; 355/308
[58] Field of Search ............... 355/228, 229, 271, 313, 355/314, 208, 285, 69, 308

[56] References Cited

U.S. PATENT DOCUMENTS

| | | | |
|---|---|---|---|
| 3,373,653 | 3/1968 | Roberts et al. | 355/5 |
| 3,677,637 | 7/1972 | Van Auken et al. | 355/45 |
| 4,324,485 | 4/1982 | Asakura et al. | 355/8 |
| 4,341,463 | 7/1982 | Kashiwagi et al. | 355/5 X |
| 4,501,483 | 2/1985 | Romansky et al. | 355/3 FU |
| 4,505,575 | 3/1985 | Palumbo | 355/14 E |
| 4,568,173 | 2/1986 | Abuyama | 355/14 R |
| 4,600,293 | 4/1986 | Watanabe | 355/8 |
| 4,616,921 | 10/1986 | Matson et al. | 355/5 |
| 4,618,245 | 10/1986 | Fukushi et al. | 355/3 FU X |
| 4,627,703 | 12/1986 | Suzuki et al. | 355/3 R |
| 4,627,710 | 12/1986 | Goetz | 355/14 R |
| 4,633,405 | 12/1986 | Ito et al. | 355/14 R X |
| 4,634,260 | 1/1987 | Watanabe | 355/7 |
| 4,673,282 | 6/1987 | Sogame | 355/14 E |

FOREIGN PATENT DOCUMENTS

| | | | |
|---|---|---|---|
| 56-117259 | 9/1981 | Japan | 355/14 R |
| 59-201078 | 11/1984 | Japan | 355/14 FU |
| 60-140281 | 7/1985 | Japan | 355/14 FU |

Primary Examiner—Joan H. Pendegrass
Attorney, Agent, or Firm—Cushman, Darby & Cushman

[57] ABSTRACT

This invention provides a microfilm reader/printer which in the power saving mode, namely, in the case when the machine is not in use, though the power is turned on, interrupts the supply of power to the unnecessary circuits, in particular, power to the light source drive for projecting microfilms is interrupted. Therefore, power consumption can be reduced as well as a prolongation of the life of the light source device can be realized. In addition, this microfilm reader/printer is designed so that the printing operation will not return to a prescribed printing mode even when the printing is interrupted for a fixed length of time, so that no misprints will occur even when a printing operation is resumed after a fixed length of time. Furthermore, this microfilm reader/printer device is reset to a prescribed number of prints after completion of the printing operation so that in the next printing the number of prints made will not be beyond what is needed even when the printing is carried out without confirmation of the set number of prints by the next operator. Thus, operation can be made economical by eliminating the wasteful use of energy, elements of the apparatus, and operating supplies.

8 Claims, 30 Drawing Sheets

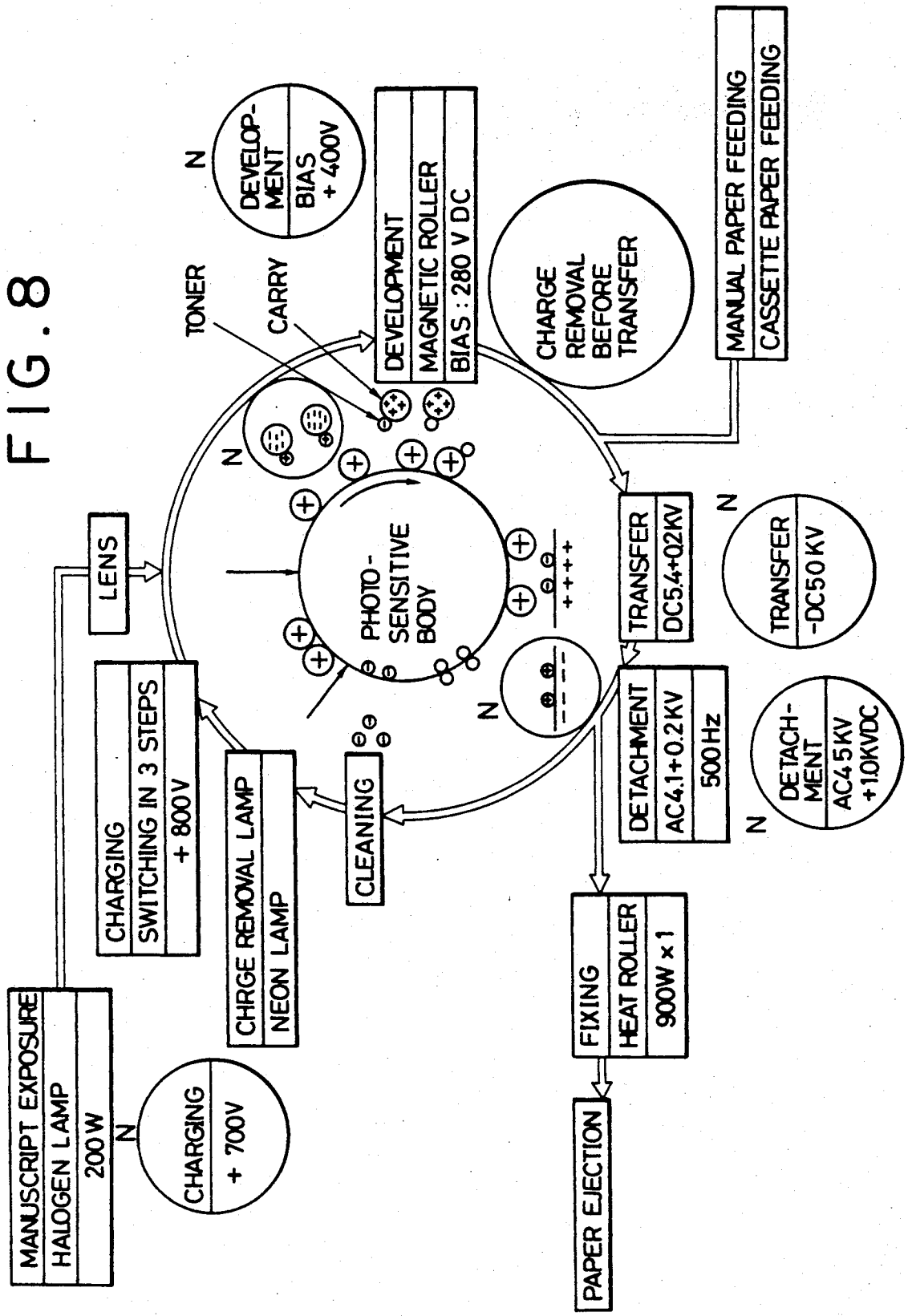

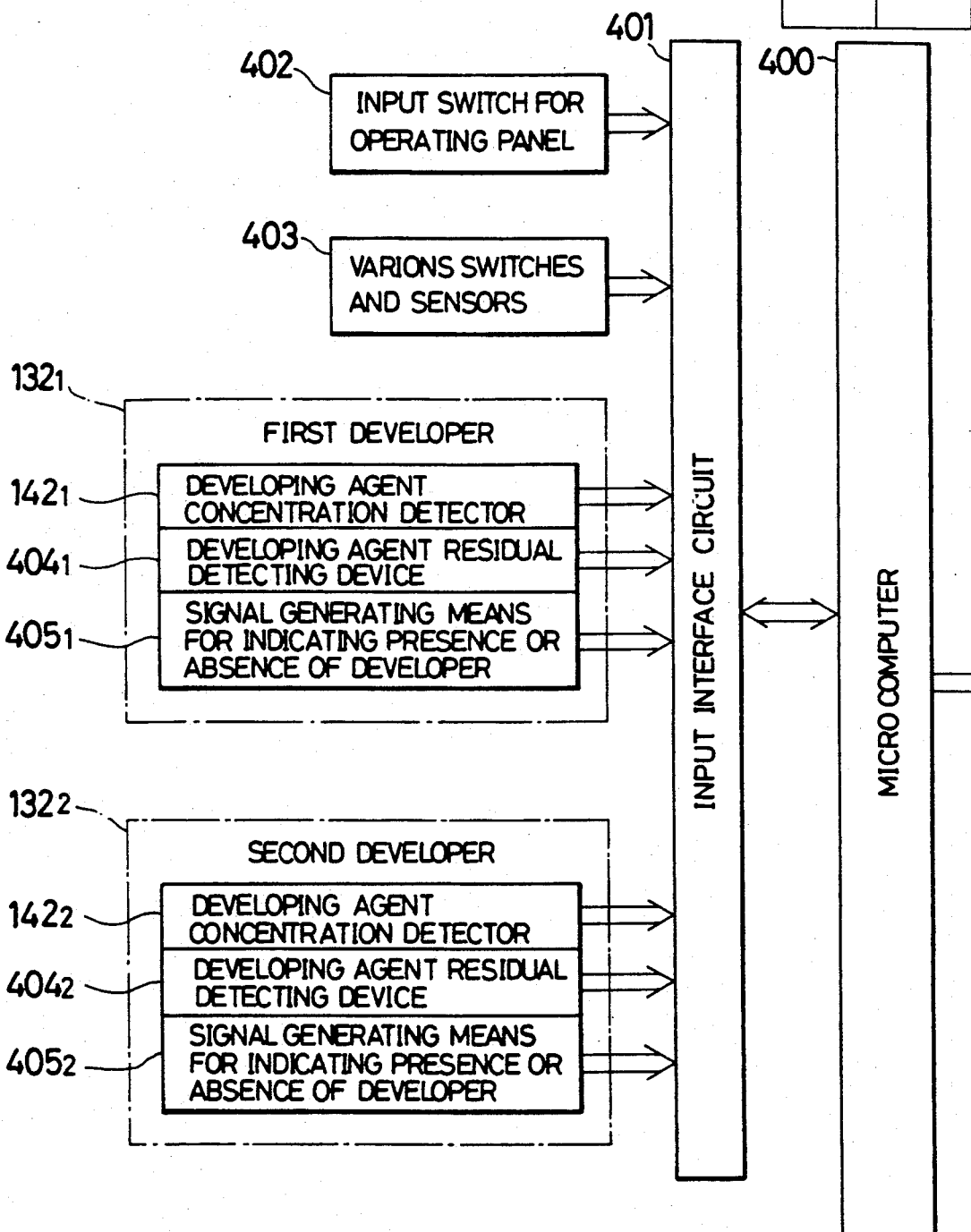

| REMOTE SIGNAL A | REMOTE SIGNAL B | APPLIED VOLTAGE TO MAGNETIC ROLL 1431 | APPLIED VOLTAGE TO MAGNETIC ROLL 1432 | |
|---|---|---|---|---|
| H | H | 0 V | 0 V | |
| H | L | 0 V | 0 V | FOR P-P DEVELOPMENT |
| L | H | 230V | 0 V | |
| L | L | 400V | 400V | FOR N-P DEVELOPMENT |

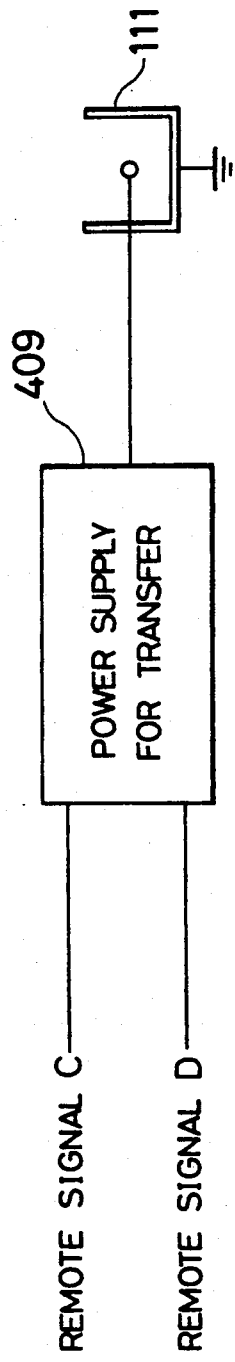

REMOTE SIGNAL E →
REMOTE SIGNAL F → POWER SUPPLY FOR DETACHMENT → 112
REMOTE SIGNAL G →

| REMOTE SIGNAL E | REMOTE SIGNAL F | REMOTE SIGNAL G | APPLIED VOLTAGE TO CHARGER FOR DETACHMENT 112 |
|---|---|---|---|
| OFF | OFF | OFF | 0 V |
| OFF | OFF | ON | 0 V |
| OFF | ON | OFF | 0 V |
| OFF | ON | ON | 0 V |
| ON | OFF | OFF | AC 4.1 KV |
| ON | OFF | ON | AC 4.1 KV + DC 1.0 KV |
| ON | ON | OFF | AC 4.5 KV |
| ON | ON | ON | AC 4.5 KV + DC 1.0 KV |

| ON/OFF STATE | POWER SAVING MODE | LIGHT SOURCE 11 |
|---|---|---|
| OFF | OFF | OFF |
| OFF | ON | OFF |
| ON | OFF | ON |
| ON | ON | OFF |

FIG.15B

| ON/OFF STATE | POWER SAVING MODE | REMOTE SIGNAL H | REMOTE SIGNAL I | REMOTE SIGNAL J | LIGHT SOURCE 11 | APPLIED VOLTAGE TO LIGHT SOURCE 11 |
|---|---|---|---|---|---|---|
| OFF | ON | OFF | OFF | OFF | OFF | — |
| OFF | OFF | OFF | OFF | ON | OFF | — |
| ON | OFF | OFF | ON | OFF | OFF | — |
| ON | OFF | OFF | ON | ON | OFF | — |
| ON | ON | ON | OFF | OFF | ON | P-P MODE |
| ON | ON | ON | OFF | ON | ON | N-P MODE |
| ON | ON | ON | ON | OFF | ON | SCREEN MODE |
| ON | ON | ON | ON | ON | ON | SCREEN MODE |

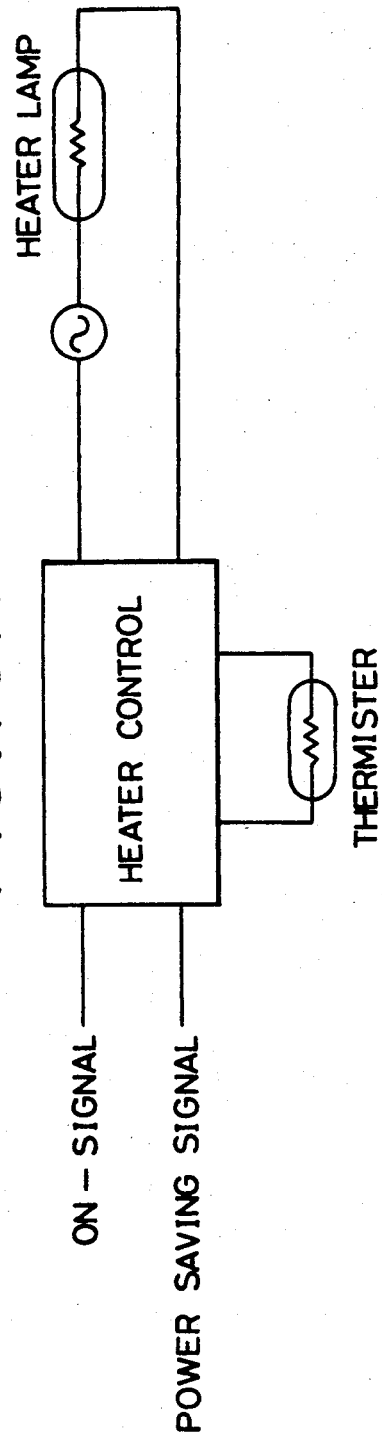

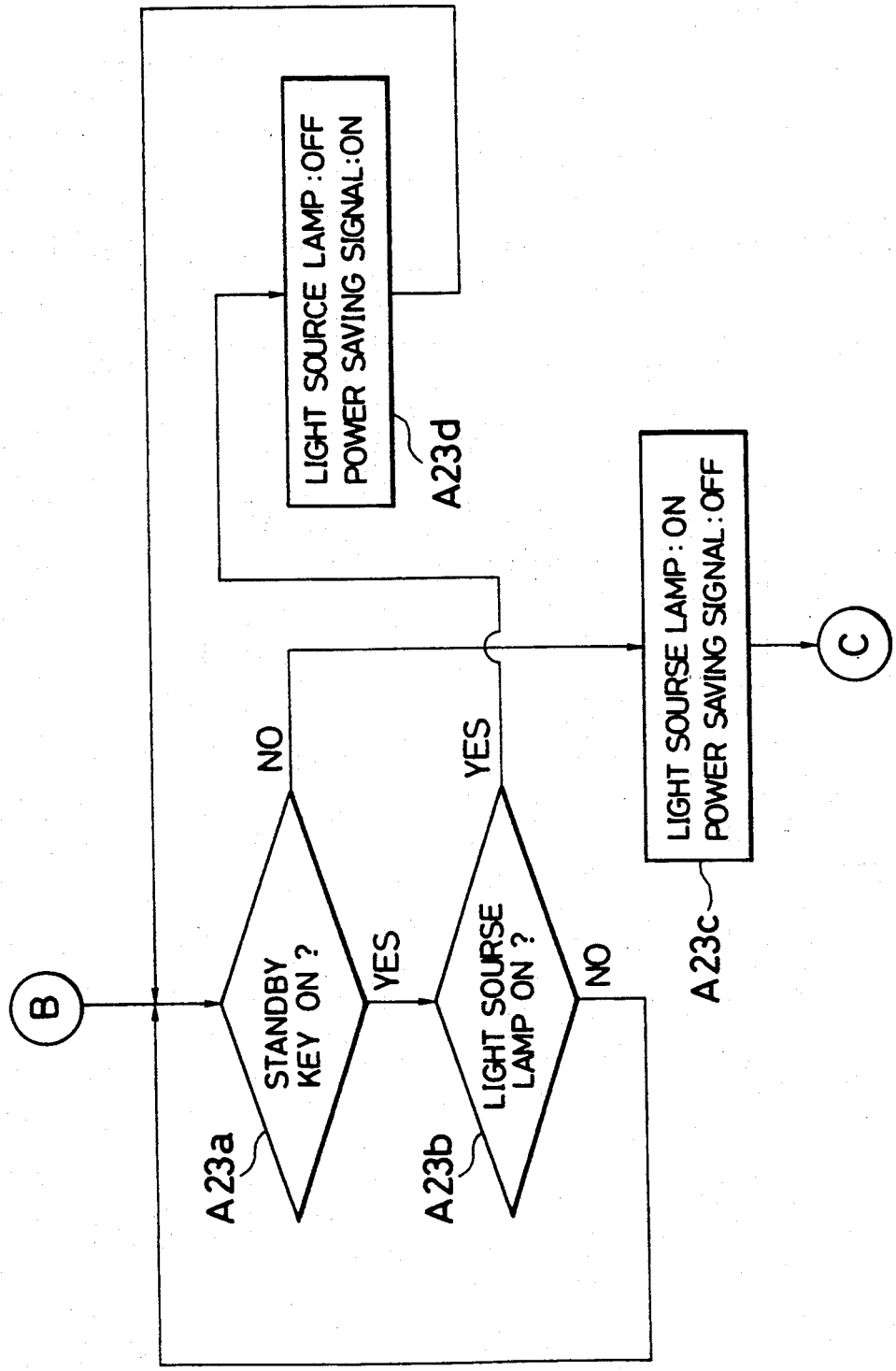

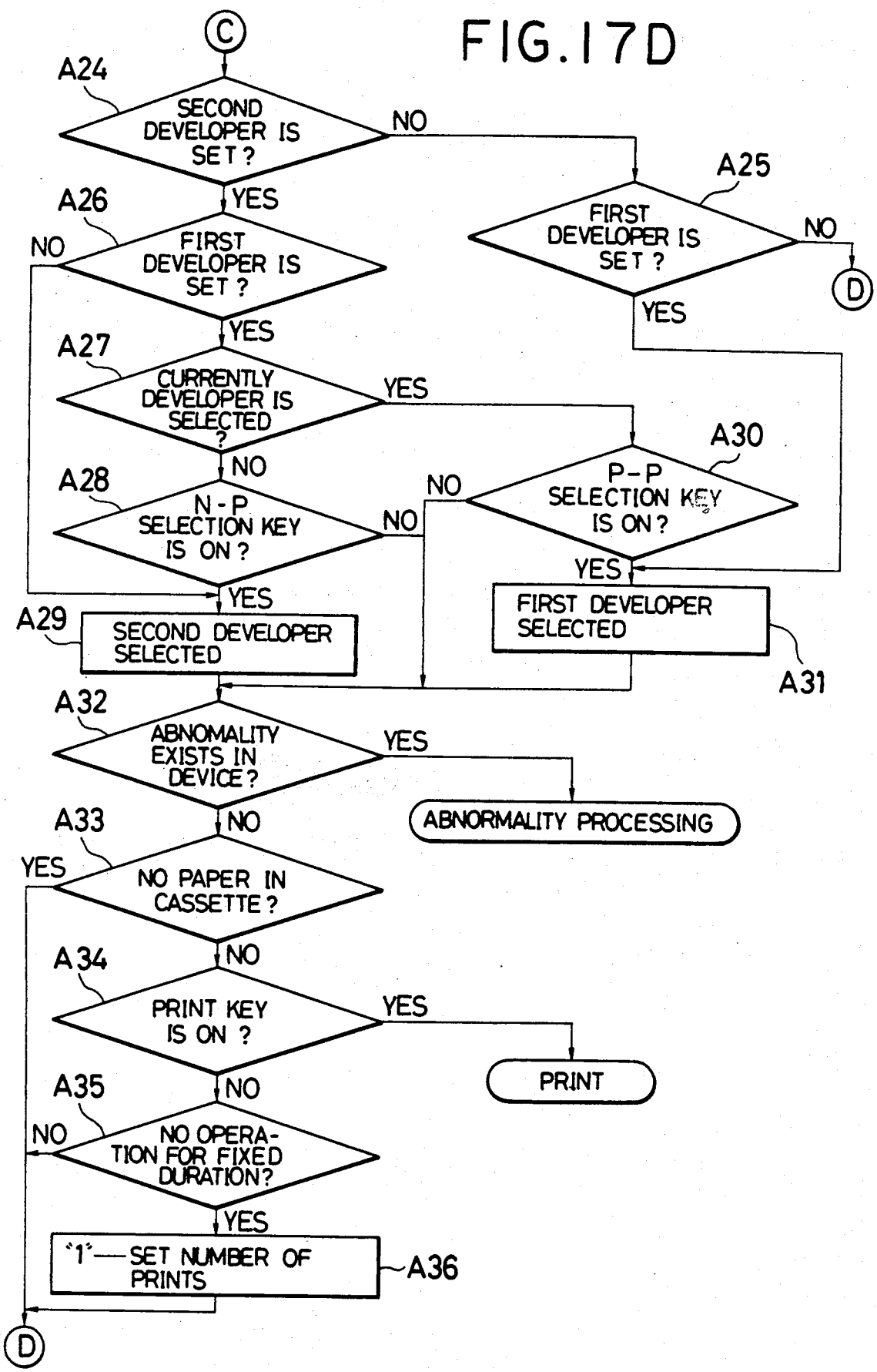

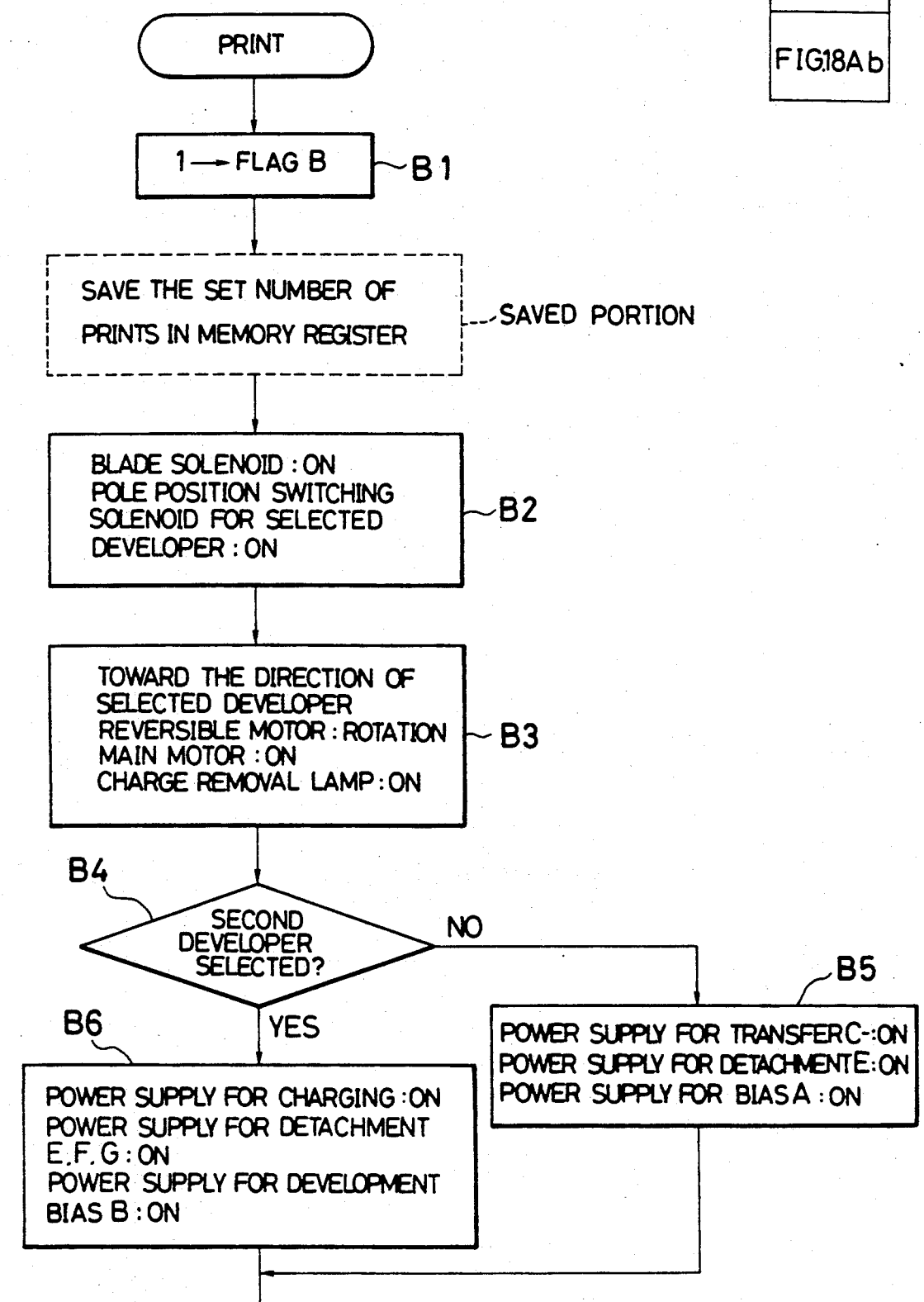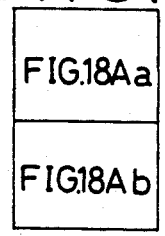

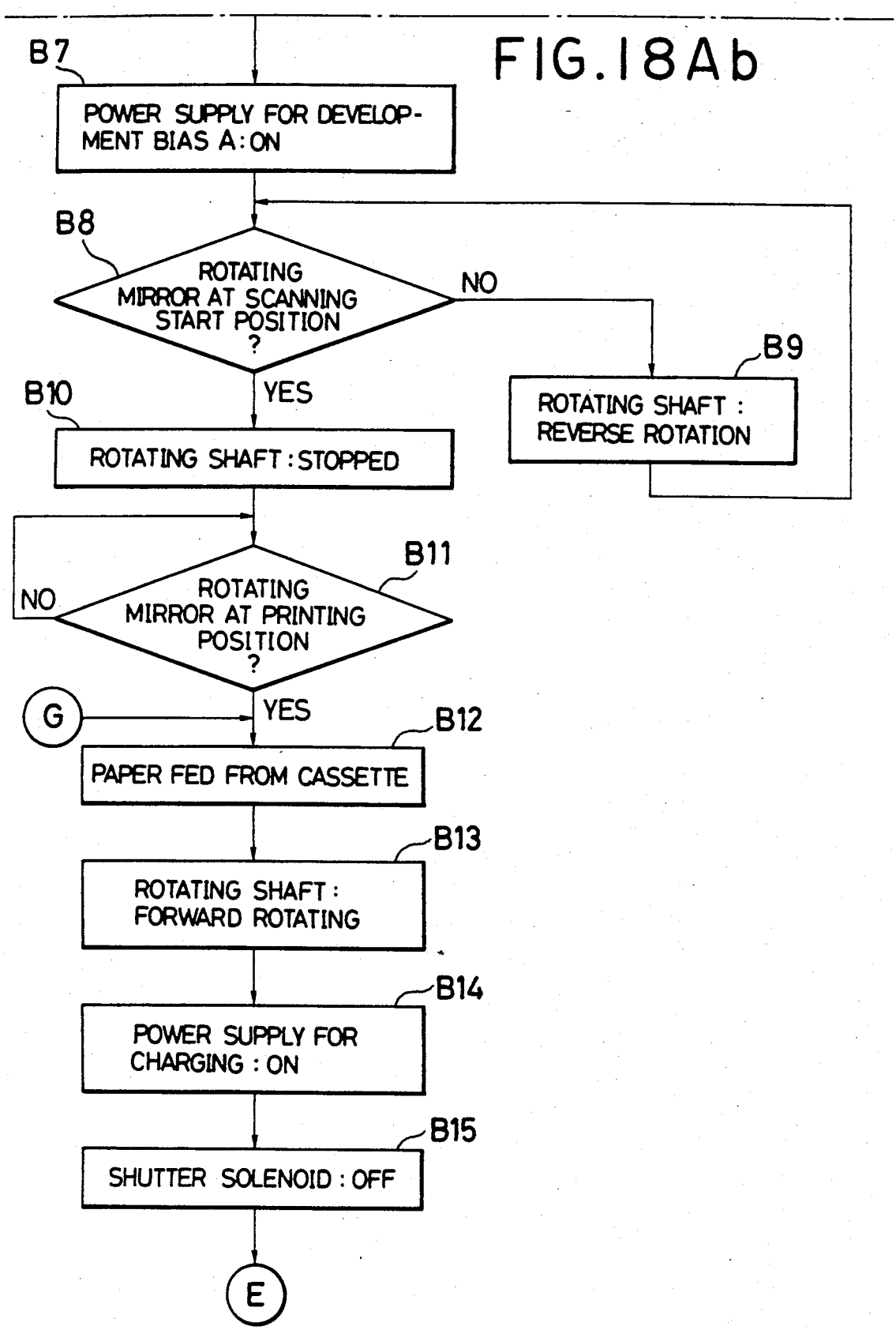

READER/PRINTER DEVICE WITH POWER SAVER FUNCTION AND PRINT NUMBER RESET

This is a continuation of Application No. 07/312,309, filed on Feb. 17, 1989, which was abandoned upon the filing hereof and which was a continuation of Application No. 06/905,563, filed Sept. 10, 1986, abandoned on Feb. 17, 1989.

BACKGROUND OF THE INVENTION

1. Field of the Invention

The present invention relates to a microfilm reader/printer, and more particularly to a microfilm reader/printer which displays by projection the image information that is recorded in the microfilm on a screen, or prints the information on a recording paper or the like.

2. Description of the Prior Art

Microfilm has been used widely hitherto for recording and keeping various kinds of information. Since microfilm records information as image information reduced in size, there is provided a device, namely, a microfilm reader/printer which optically projects the reduced image information that is recorded in the microfilm on the screen to display it enlarged, and print the information on a recording paper as need arises.

Now, there are two kinds of images recorded in a microfilm, namely, a positively recorded image and a negatively recorded image. Accordingly, in printing out these two kinds of microfilms, there are two cases of printing, that is, printing out a positively recorded image as a positively printed image and printing out a negatively recorded image as printed image. Generally speaking, there are more of the negatively recorded image type of microfilms such that the printing mode of printing a negatively recorded image into a positively printed image is automatically set as the priority mode for the microfilm reader/printer. Thus, if an operator who has been using the machine in another printing mode, for instance, printing out a microfilm which is recorded in positive images into positive images, interrupts the printing operation for a relatively short time, the machine returns automatically to the priority mode mentioned above. As a result, if the operator resumes the printing operation without noticing this change, the machine performs printing according to the priority mode which is a mode that is different from what he has been doing earlier intermittently resulting in a misprint.

Further, in the printing operation, the number of prints desired is set by the previous operator. The number of prints thus set is memorized, for instance, in the memory register, and in the prior-art device, it is arranged that the number of desired prints set by the previous operator is saved in the memory register at the completion of the printing operation. For this reason, with a shift in the operator, if the next operator carries out the printing operation with neither confirming nor clearing the number of prints set by the previous operator, the machine will proceed to print out according to the desired number of prints as set by the previous operator. This may lead sometimes to printing of more than what is needed, which leads to the waste of recording papers, toner, and other materials.

Moreover, the main power supply to the microfilm reader/printer is ordinarily turned off for energy saving reasons when the machine is not in use. However, when the main power source is turned off, the device is turned off as a whole so that the heater lamp for fixing the developed image of the image information on the recording paper is either turned off or at a temperature which is below the fixing temperature. Consequently, the machine cannot be used again until the heater lamp attains the fixing temperature, which is very inconvenient.

Now, to obtain the projection light for the microfilm, it is necessary to provide a lamp for the light source. If the main power supply is kept in the state of turned on in the prior-art microfilm reader/printer, in order to eliminate the above-mentioned inconvenience, the light source lamp is kept in the state of lighting, so that the life of the light source lamp is shortened and a wasteful consumption of power is also generated. In addition, a large amount of power is also required to keep the heater lamp at the fixing temperature.

SUMMARY OF THE INVENTION

Accordingly, an object of the present invention is to provide a microfilm reader/printer which makes it possible to reduce the power consumption, when it is in power saving mode, by interrupting the supply of power to unnecessary circuits, in particular, to the light source device for projecting microfilm, and in addition to improve the life of the light source device.

Another object of the present invention is to provide a microfilm reader/printer which does not return to a specific printing mode even when the printing operation is interrupted for a fixed length of time.

Another object of the present invention is to provide a microfilm reader/printer which is reset to a prescribed number of print a upon completion of the printing operation.

According to the present invention, in the power saving mode, namely, in the case when the machine is not in use, though the power is turned on, supply of power to the unnecessary circuits, in particular, to the light source device for projecting microfilms, is interrupted. Therefore, power consumption can be reduced and a prolongation of the life of the light source device can be realized.

In addition, according to the present invention, it is designed that the printing operation will not return to a prescribed printing mode even when the printing is interrupted for a fixed length of time, so that no misprints will occur even when printing operation is resumed after a fixed length of time.

Furthermore, according to the present invention, the device is reset to a prescribed number of prints after completion of the printing operation, and in the next printing there will not be obtained prints beyond what is needed even when the printing is carried out without confirmation of the set number of prints by the next operator, so that operation can be made economical by eliminating the waste in the recording papers, toner, and others.

BRIEF DESCRIPTION OF THE DRAWINGS

FIG. 8 is an explanatory diagram for illustrating both developing operations of positive to positive and negative to positive developments, FIGS. 9 (A) and 9 (B) are schematic explanatory diagrams for showing positive and negative microfilm images, respectively, FIG. 10 is a schematic explanatory diagram for the operating panel, FIG. 11 consisting of FIGS. 11a and 11b is a block diagram for showing the control circuit for the present device, FIGS. 12 (A) and 12 (B) are a block diagram for the power supply for development bias and a related table, respectively, FIGS. 13 (A) and 13 (B) are a block diagram for the power supply for transfer and a related table, respectively, FIGS. 14 (A) and 14 (B) are a block diagram for the power supply for detachment and a related table, respectively, FIGS. 15 (A), 15 (B) and 15 (C), are a block diagram for the light source control circuit and a related table, respectively, FIGS. 16 (A) and 16 (B) are a block diagram for the heater control circuit and a related table, respectively, FIGS. 17 (A) to 17 (D) are flow charts that show the operation at the time of turning the power supply on, FIGS. 18 (A) consisting of FIGS. 18Aa and 18Ab, 18 (B), 18 (C), and 18 (D) are flow printing operation at the time of turning the power supply on, and FIGS. 19 (A) and 19 (B) are flow charts that show the interruption operation at the time of turning the power supply on.

DESCRIPTION OF THE PREFERRED EMBODIMENT

Referring to the figures, an embodiment of the present invention will be described in the following.

First, referring to FIGS. 1 and 2, an outline of the microfilm reader/printer in accordance with the present invention will be described.

Figure 1:
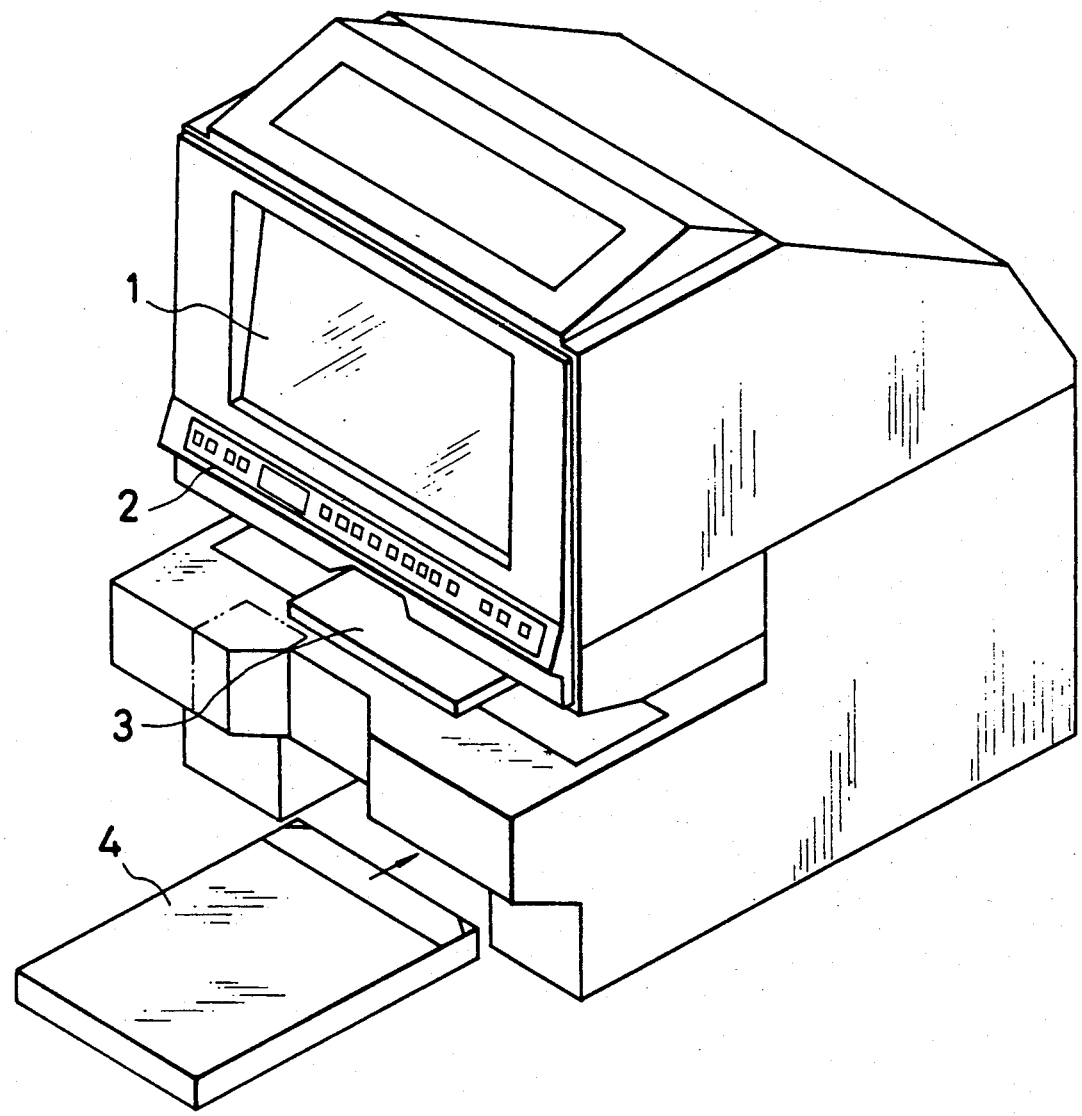
FIG. 1 is an external perspective view of the microfilm reader/printer in accordance with a first embodiment of the present invention.
Figure 2:
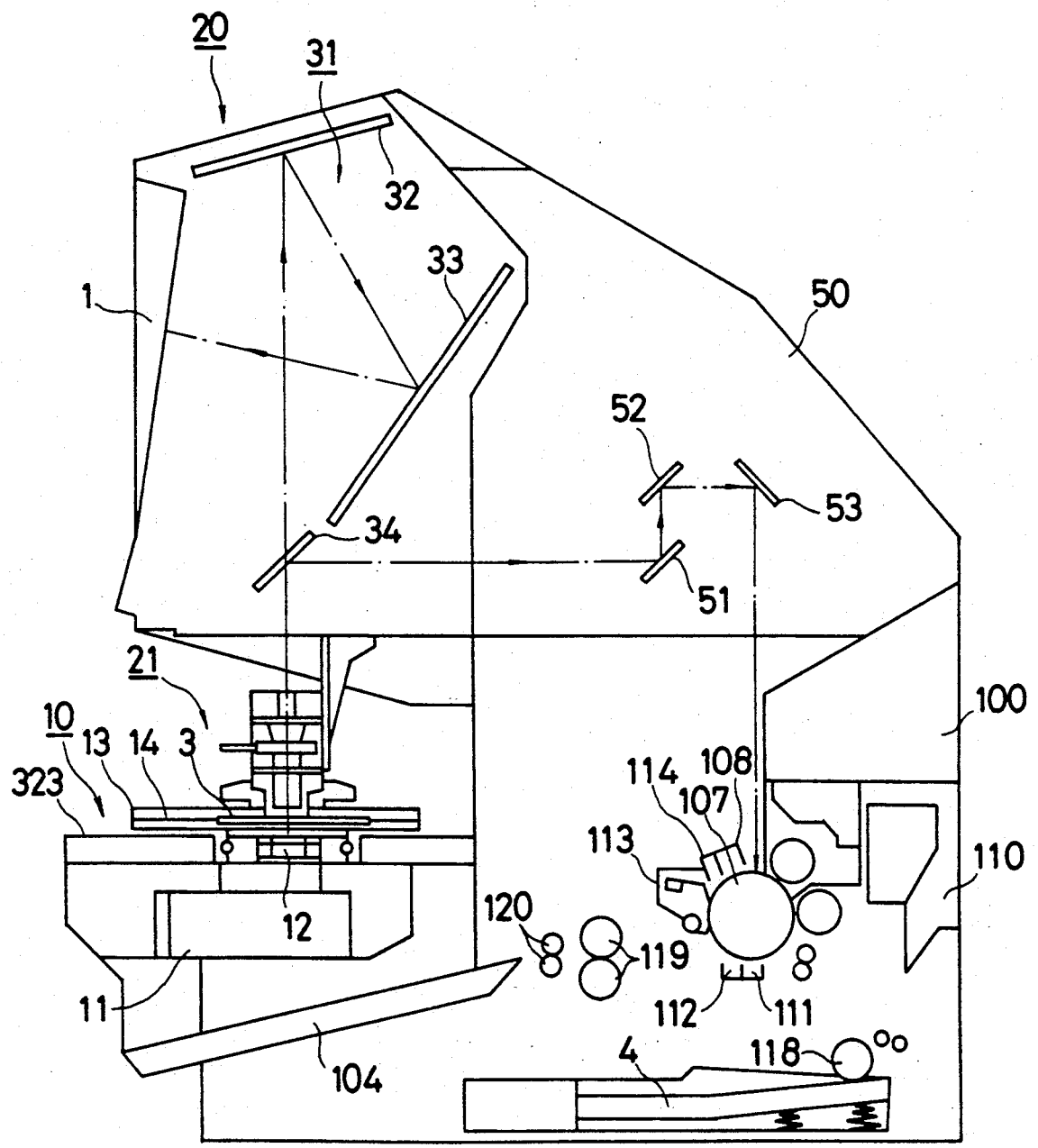
FIG. 2 is a schematic sectional view of the device shown in FIG. 1, FIG. 3 (A) is a sectional view for the lens holding unit of the device shown in FIG. 1, FIG. 3 (B) is a disassembled perspective view of the lens holder unit.

FIG. 1 is an external perspective view of the microfilm reader/printer and FIG. 2 is a schematic sectional view of the same device. In the microfilm reader/printer shown in FIG. 1, a projection screen 1 for projecting microfilms by enlarging, an operating panel 2 that is equipped with various kinds of operating keys, film pressing plates 3 for holding a microfilm in between, and so on are arranged on the front side. A paper feeding cassette 4 for housing the recording papers for film printing is made free to be inserted and retrieved from the front side, and in addition, it is arranged that papers with printed images thereon can be ejected to the upper part of the insertion and retrieval opening for the paper feeding cassette 4. For this reason, it is arranged that the operations required for projection and printing of microfilms can be carried out from the front side of the body of the device.

Further, as its internal configuration 1 shown in FIG. 2, the microfilm reader/printer has the film pressing plates 3 in its upper part, and comprises a film setting unit 10 that has a built-in light source 11 for projection placed below the pressing plates 3, a projection unit 20 for projecting film images on the projection screen 1, a scanning light guiding unit 50 for guiding the scanning light formed by a rotating mirror 34, and an image formation unit 100 for forming an image on a recording paper, which is the recording medium housed in the paper feeding cassette 4, based on the scanning light from the scanning light guiding unit 50.

Next, the configuration and the operation of each of the units 10, 20, 50, and 100 will be described.

Figure 3A:
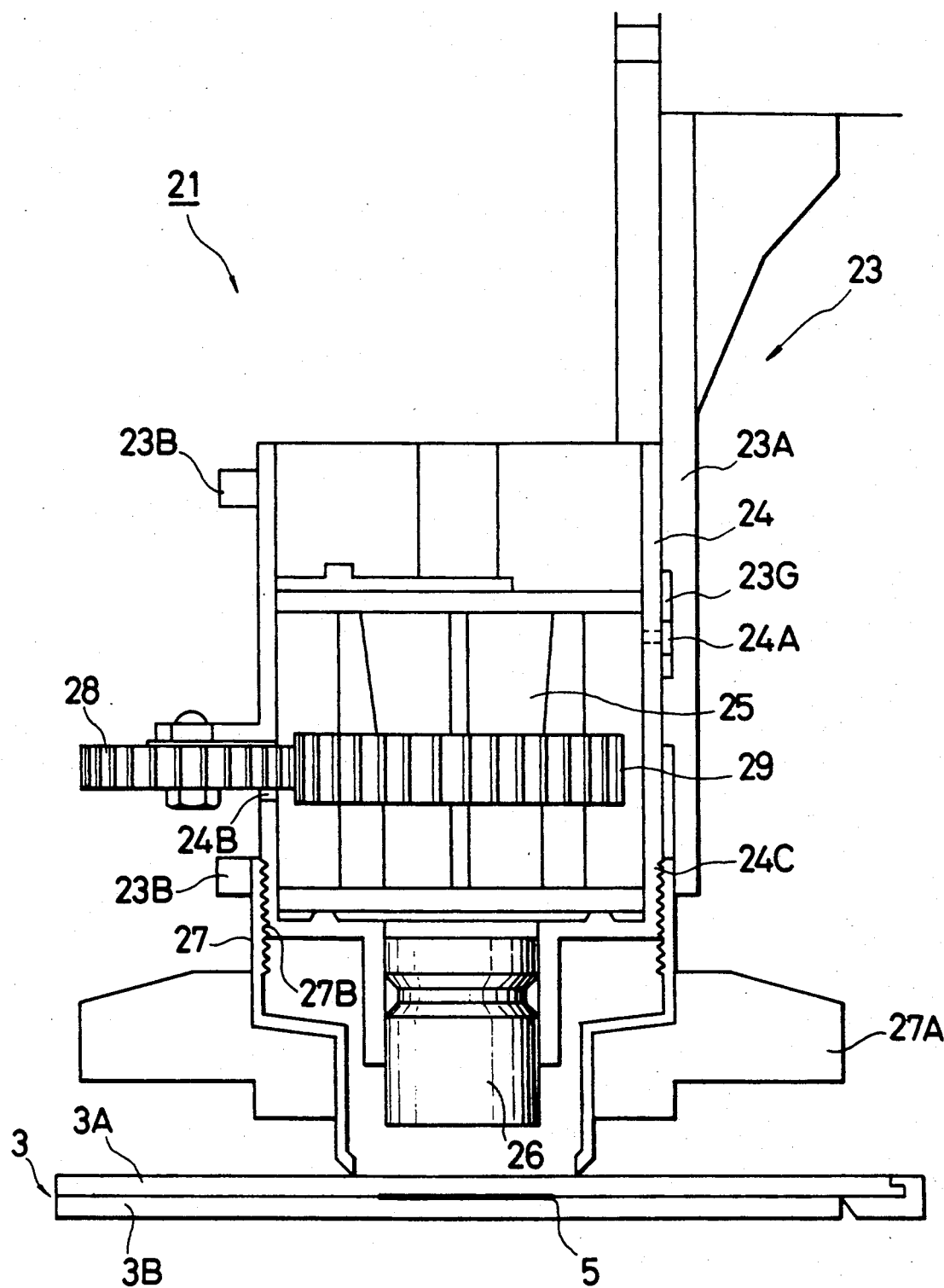
Figure 3B:
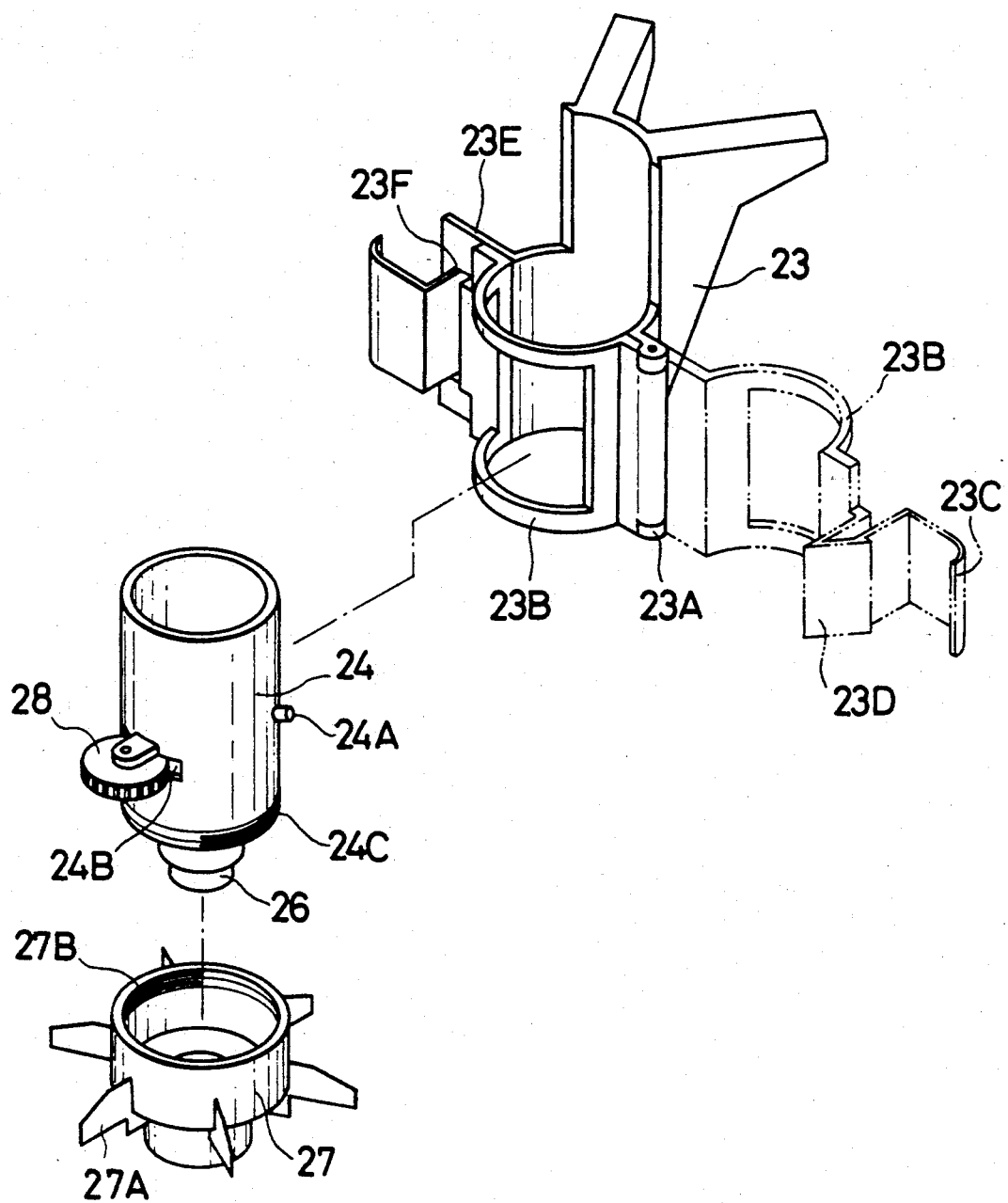

First, referring to FIG. 2 and FIG. 3 (A), the film setting unit 10 will be described. The film setting unit 10 has the light source 11, a condenser lens 12 placed over the light source 11, and the film pressing plates 3. It is arranged that light from the light source 11 is to be irradiated via the condenser lens 12 on the microfilm 5 that is held in the film pressing plates 3. The light source 11 is arranged to be turned off automatically when it is lighted continuously for a prescribed duration. This is intended to prolong the life of the light source 11 which is relatively short, and will further be shortened due to successively repeated manual turning on and off of the light source. The film pressing plates 3 consist, as shown in FIG. 3 (A), of a pair of transparent plates 3A and 3B which hold the microfilm 5 between them. Further, the film pressing plates 3 are made to be movable in the back and forth and left and right directions on a plane over the condenser lens 12 by the operation of a grip section 13 shown in FIG. 2. Moreover, in the grip section 13 there is formed a pointer 14 so that it is arranged to be movable over the coordinates on a front panel 323 that is mounted on the lower front part of the device. Accordingly, when a microfilm 5 with a plurality of information recorded on it is held in the film pressing plates 3, by the operation of the grip section 13 it is arranged to be able to move the pointer 14 along the coordinates, and to set a desired information over the condenser lens 12, with the coordinates as measures. Further, in setting a web of microfilm, the film pressing plates 3 and the accessory units are arranged to be interchanged such that various forms of microfilms can be set in the machine. In interchanging such units, the light source 11 is arranged to be turned off, based on the output of a sensor that is not shown, that detects the presence or absence of such units. This is to prevent a wasteful projection and a leakage of light when the units are removed.

Next, referring to FIG. 2, FIGS. 3 (A) and 3 (B), the configuration and operation of the projection unit 20 will be described. The projection unit 20 consists of a lens holder unit 21 and a screen projection unit 31.

The lens holder unit 21 carries out adjustment for projected images and adjustment for rotation of projected images on the projection screen 1. The lens holder unit 21 is constructed, as shown in FIGS. 3 (A) and 3 (B), by a holder 23 which is fixed over the light source 11, a casing 24 which is slidable along the longitudinal direction of the holder 23, a prism 25 which is arranged rotatably at the midsection of the casing 24, a lens 26 which is fixed to the bottom side of the casing 24, and a focus adjusting member 27, with its upper end screwed to the bottom side of the casing 24 and its lower end pressed against the film pressing plates 3.

The holder 23 is formed as a hollow cylinder, and one section of the cylindrical member that is cut into two sections forms a movable member 23B which can be freely opened and closed via a hinge 23A, as shown in FIG. 3 (B). On the movable member 23B there are formed a grip section 23C for opening and closing as well as a wedge-shaped hooking piece 23D. Further, on the fixing member 23E, which is the other half of the cylindrical member, there is formed a notched section 23F that hooks and holds the hooking piece 23D, when the movable member 23B is closed. Moreover, on the inner wall of the fixing member 23E there is formed a guiding groove 23G as shown in FIG. 3 (A).

As shown in FIG. 3 (B), the casing 24 is a cylinder which is slidable within the holder 23, and has a projection 24A which protrudes from its outer periphery. The projection 24A is inserted, as shown in FIG. 3 (A), to the guiding groove 23G which is provided on the inner wall of the holder 23, and serves as a stopper that prevents the rotation of the casing within the holder 23. Further, in one section of the outer wall of the casing 24 there is formed a notched section 24B to which is fitted one end of a projected image rotation adjustment gear 28 to be held there. On the other hand, on the periphery of the prism 25 that is supported rotatably in the casing 24, there is fixed a gear 29 that engages the projected image rotation adjustment gear 28. Therefore, by rotating the projected image rotation adjustment gear 28, the prism 25 will be rotated. By the rotation of the prism 25, the projected image is arranged to be rotated. Further, on the outer periphery at the lower end of the casing 24, there are formed threads 24C as shown in FIG. 3 (B).

The focus adjusting member 27 is formed as a stepped cylinder, with a plurality of vanes 27A formed protruding radially on its outer wall, and threads 27B formed on the upper end of its inner wall. The focus adjusting member 27 is mounted on the lower end side of the casing 24 by being fitted to the threads 27B and the threads 24C on the casing 24. The bottom end of the focus adjusting member 27 is arranged to be pressed against the film pressing plates 3 by means of the casing 24 and the self weight of the focus adjusting member 27. Consequently, when the vanes 27A are rotated, the focus adjusting member 27 is rotated at that position by being pressed against the film pressing plates 3. However, the focus adjusting member 27 that is screwed to the casing 24 can be moved up and down within the holder 23. Because of this, the clearance between the film pressing plates 3 and the lens 26 that is fixed to the casing 24 is varied so that focus adjustment can be carried out.

The screen projection unit 31 displays projected images on the projection screen 1, based on the projected light that is incident via the lens holder unit 21. In addition to the projection screen 1, as component members for having projection on the projection screen 1, there are arranged first and second mirrors 32 and 33 in the screen projection unit 31. Namely, projected light that is incident via the lens holder unit 21 is reflected successively by the first and second mirrors 32 and 33, and is projected then on the projection screen 1. Further, on the incidence end side of the screen projection unit 31, there is arranged a rotating mirror 34 which can be moved back and forth along the direction from the front to the rear surface of FIG. 2, and can be given variable inclination for the mirror surface. During projection on the projection screen 1, the rotating mirror 34 is held at a position which is away from directly above the lens holder unit 21 so as not to obstruct the incidence of the light on the first mirror 32. Further, when printing is being carried out in the image formation unit 100, the rotating mirror 34 is disposed over the lens holder unit 21, and leads the projected light, by successively scanning it by changing the inclination of the mirror surface, to the scanning light guiding unit 50 which comes in the succeeding stage. The reciprocating motion of the rotating mirror 34 is driven by a motor which is not shown.

Figure 4:
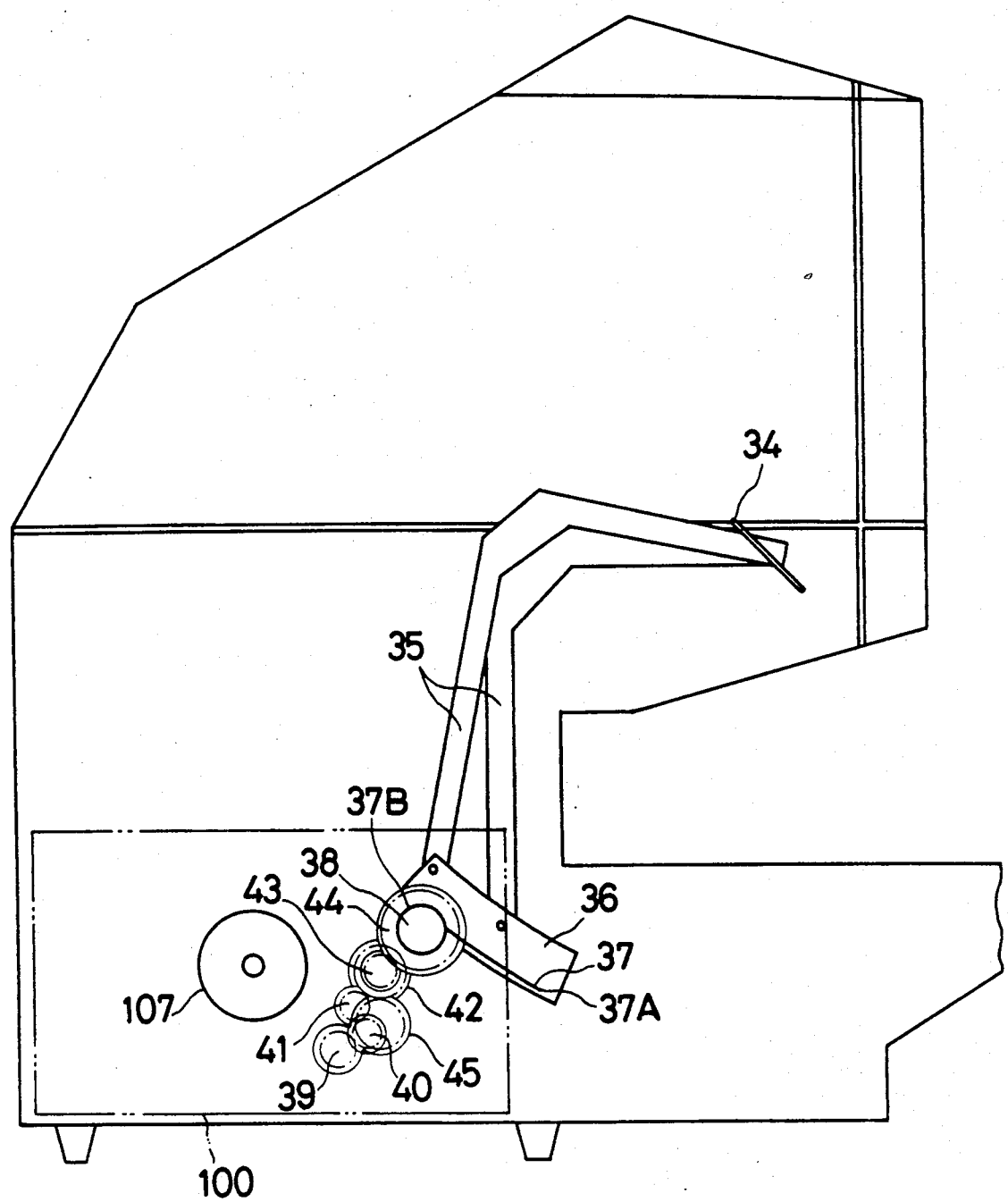
FIG. 4 is a schematic explanatory diagram for showing the driving system for the rotating mirror in the scanning means.

Referring to FIG. 4, the rotary driving mechanism of the rotating motor 34 will be described. In FIG. 4, the rotating mirror 34 which is supported freely rotatably in the projection unit 20 is fixed to one end of each of the two arms 35 and 35. The other end of each of the arms 35 and 35 is supported freely turnably by a moving plate 36. On one end of the moving plate 36 there is fixed one end 37A of a steel belt 37. The other end 37B of the steel belt 37 is fixed to the periphery of a rotating shaft 38. Accordingly, by the driving of the rotating shaft 38 in the counterclockwise direction, the steel belt 37 is wound around on the periphery of the rotating shaft 38. The moving plate 36 is displaced due to winding of the steel belt 37 and the rotating mirror 34 is driven to scan by the transmission of the displacement of the moving plate 36 via the arms 35 and 35. On the other hand, when the wound steel belt 37 is pulled out by the drive of the rotating shaft in the clockwise direction, the rotating mirror 34 is returned to its original condition.

Next, the driving system of the rotating shaft 38 will be described. First, the drive of the rotating shaft 38 in the counterclockwise direction will be explained. The first gear 39 is directly connected to a driving motor for a photosensitive body 107, to be described later, that is located within the image formation unit 100. The driving system for the counterclockwise direction consists of the first gear 39, a second gear 40 that engages the first gear 39, a third gear 41 that engages the second gear 40, a fourth gear 42 that engages the third gear 41, a fifth gear 43 that is fixed coaxially with the fourth gear 42, and a sixth gear 44 which is fixed to the rotating shaft 38 and engages the fifth gear 43. In addition, the fourth and the fifth gears 42 and 43 are made slidable from the rear to the front of FIG. 4 by means of a driving means that is not shown. Then, by the constant counterclockwise rotation of the first gear which serves as the driving gear, the rotating shaft 38 is arranged to be rotated in the counterclockwise direction in accordance with the sequence of gears. Further, the driving system for rotating the rotating shaft 38 in the clockwise direction consists of the first gear 39, a seventh gear 45 that engages the first gear 39, and the fourth, fifth, and sixth gears 42, 43, and 44. By the sliding engagement of the fourth and the fifth gears 42 and 43 with the seventh gear 45, the rotating shaft 38 is driven to be rotated in the clockwise direction based on the rotation of the first gear in the counterclockwise direction.

With the above configuration, the scanning drive and the returning drive to the initial condition of the rotating mirror 34 can be accomplished based on the constant drive of the first gear in the counterclockwise direction. Moreover, since the first gear is fixed to the driving motor for the photosensitive body 107, it becomes possible to carry out the scanning drive of the rotating mirror 34 over a prescribed range of angle, synchronized with the rotating drive of the photosensitive body 107. Furthermore, the rotating mirror 34 is driven by the winding and unwinding of the steel belt 37 so that it is possible to drive smoothly the rotating mirror 34 for a desired angle, following the drive for many rotations of the rotating shaft 38. Still further, by the use of two arms 35 and 35, the drive of the rotating mirror 34 that is based on the displacement of the moving plate 36, can be made to be carried out smoothly. Yet further, a smoother driving of the arms 35 and 35 may be arranged to be obtained by forming them by the use of a material which is flexible, in addition to the use of die-cast aluminum which can give high accuracy of dimension.

The scanning light guiding unit 40 guides the scanning light reflected from the rotating mirror 34 so as to form an image on the photosensitive body 107 in the image formation unit 100. The scanning light guiding unit 50 consists of a third, fourth, and fifth mirrors 51, 52, and 53.

Figure 5:
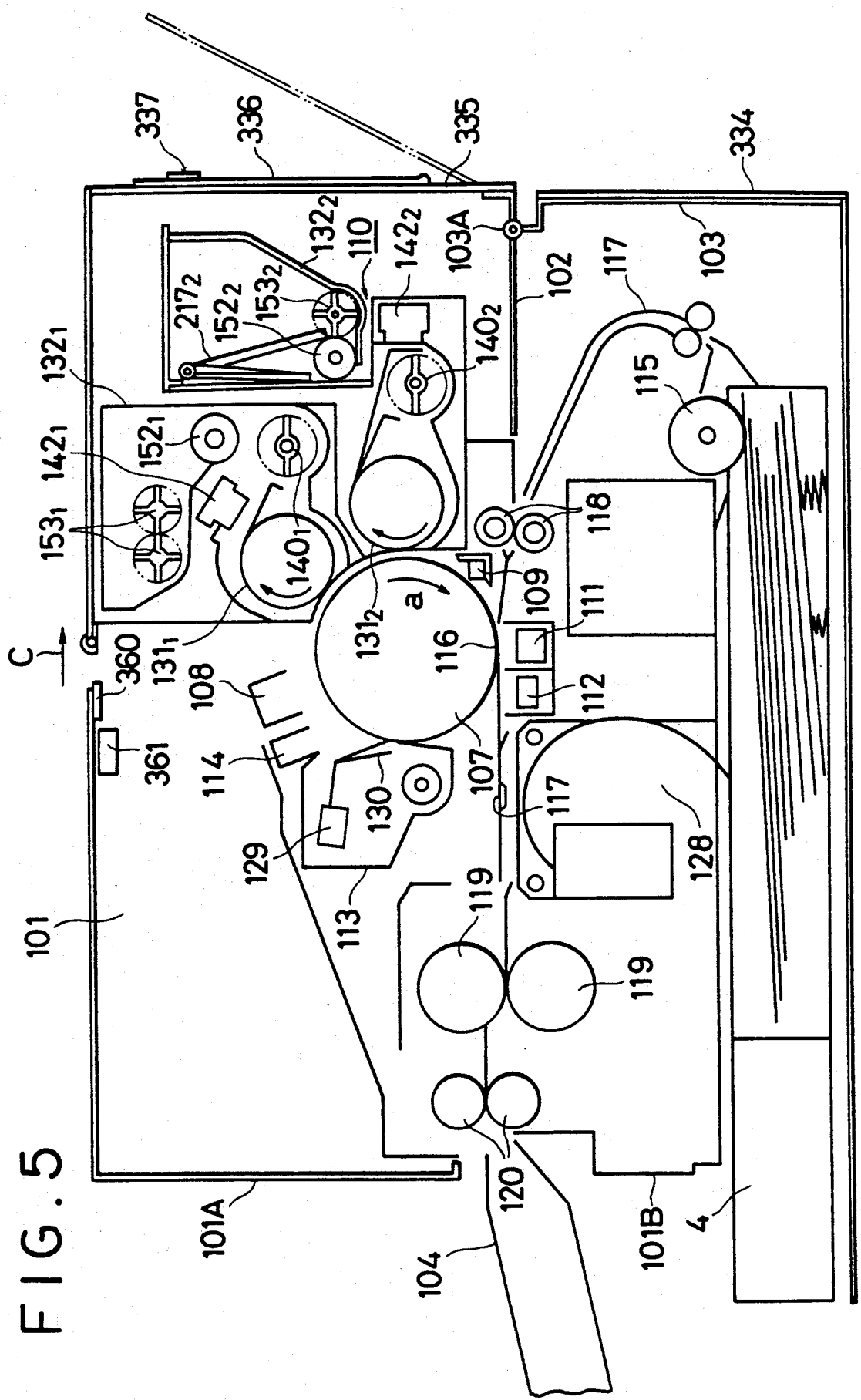
FIG. 5 is a simplified sectional view of the image formation unit.

Next, the configuration and the operation of the image formation unit 100 will be described. FIG. 5 is a schematic sectional view of the image formation unit 100. In the figure, 101 is the main body of the image formation unit, and on the bottom and on the left-side (front side of the microfilm reader/printer) of the body 101, there are arranged the paper feeding cassette 4 and a tray for ejected papers 104, respectively. In addition, at about the center of the body 101 there is provided the photosensitive body 107 which is an image bearer. Above the photosensitive body 107 there are arranged a shutter mechanism 360 for shielding the scanning light from the scanning light guiding unit 50, and a solenoid 361 for driving the mechanism. Further, in the surroundings of the photosensitive body 107 there are arranged successively a charger for charging 108 that is a charging means, a developing device 110, a pre-transfer charge removing device 109, a charger for transfer 111 that is a transferring means, a charger for detachment 112, a cleaning device 113, a charge removing lamp 114, and so forth. Further, in the lower part of the body 101, there is formed a paper transporting route 117 which leads a paper P that is taken out automatically from the paper feeding cassette 4 via a paper feeding roller 115, to the tray for ejected papers 104 through an image formation unit 116 formed between the photosensitive body 107 and the charger for transfer 111. On the upstream side of the image transfer unit 116 of the paper transporting route 117, there are arranged resisting rollers 118, and on the downstream side there are provided heating rollers 119 as a fixing device, and paper ejecting rollers 120.

Now, when the photosensitive body 107 is driven in the direction of the arrow a in the figure, it is first charged uniformly by the charger for charging 108, scanning light from the scanning light guiding unit 50 is imaged successively on the photosensitive body 107, an electrostatic latent image is developed by the developing device 110 to bring out the explicit image, and is sent into the side of the charger for transfer 111. On the other hand, paper P supplied by the paper feeding cassette 4 is provided by the resisting rollers 118, and the image formed on the photosensitive drum 107 in advance is transferred onto the paper P by the charger for transfer 111. The paper P with the transferred image on is detached from the photosensitive body 107 by the charger for detachment 112, and is led to the heating rollers 119 by passing the paper transporting route 117. After the transferred image is fixed by melting, the paper is ejected to the tray for ejected papers 104 by the paper ejecting rollers 120. On the other hand, after transfer of image to the paper P, the residual image on the photosensitive body 107 is erased, and preparation for the next copying operation is completed.

In addition, in the body 101, end sections of the upper frame 102 and the lower frame 103 are hinged together via a supporting axis 103A. In the upper frame 102, in the surroundings of the photosensitive body 107, various devices such as the charger for charging 108, the developing device 110, the cleaning device 113, and the charge removing lamp 114 are mounted by appropriate means, to constitute the upper unit 101A. Further, in the lower frame 103, various mechanisms such as the paper feeding cassette 4, the charger for transfer 111, the charger for detachment 112, heating rollers 110, paper ejecting rollers 120, and the tray for ejected papers 104 and a main motor 128 are mounted with appropriate means, to form the lower unit 101B. When the upper frame 102 is turned with the supporting axis 103A as the center, the device is constructed in such a way as to be opened and closed approximately along the transporting route 117 for the paper P (called sometimes the clam shell structure). This structure facilitates the removal of the jammed papers and the general maintenance of the system. In addition, 129 is a blade solenoid for accessing and detaching the cleaning blade 130 of the cleaning device 113 to and from the photosensitive body 107.

Next, the developing device 110 will be described in detail. As is shown in detail in FIG. 6, the developing device 110 has a first developing roller $131_1$ and a second developing roller $131_2$, and selective driving of the developing rollers $131_1$ and $131_2$ permits both of the negatively recorded microfilms and the positively recorded microfilms to be developed as positive images. Namely, the developing device 110 is subdivided into two of a first developing apparatus $132_1$, that includes the first developing roller $131_1$ and a second developing apparatus $132_2$ that includes the second developing roller $131_2$, and the first developing apparatus $132_1$ is to carry out the positive to positive development while the second developing apparatus $132_2$ is to carry out the negative to positive development.

The first developing apparatus $132_1$ consists of a development mechanism unit $133_1$ and a toner supply unit $134_1$. The development mechanism unit $133_1$ is constructed by housing in a casing $141_1$ the developing roller $131_1$, a doctor $137_1$ which regulates a developer magnetic brush $135_1$ that is provided upstream of the rubbing part of the developer magnetic brush $135_1$ and the photosensitive drum 107, namely, a developing position $136_1$, a scraper $139_1$ provided in the downstream of the developing position $136_1$ which scrapes off the developer magnetic brush $135_1$ on the developing roller $131_1$ and leads the scraped material to a developer housing unit $138_1$, and a developer stirrer $140_1$ which is housed in the developer housing unit $138_1$. In addition, at a position which corresponds to the upper region of the developing roller $131_1$ of the casing $141_1$, there is attached a developer concentration detector $142_1$ which detects the concentration of the developer based on the magnetic detection of the changes in the permeability of the toner $G_1$.

Further, the developing roller $131_1$ consists of a magnetic roll $143_1$ which is provided in such a way as to have its center to be positioned on a straight line $L_2$ that is drawn through the rotation center of the photosensitive body 107 and makes an angle of $\alpha$ (about 51°) with the horizontal line $L_1$, and a sleeve $144_1$ which is fitted to the outside of the magnetic roll $143_1$ and rotates in the clockwise direction in the figure. The magnetic roll $143_1$ has five magnetic pole units $145_1$ to $149_1$ of which the magnetic pole units $145_1$, $147_1$, and $149_1$ are N poles and the magnetic poles $146_1$ and $148_1$ are S poles. The angle $\theta_1$ between the magnetic pole unit $145_1$ and the magnetic pole unit $146_1$ is set at about 50°, the angle $\theta_2$ between the magnetic pole unit $146_1$ and the magnetic pole unit $147_1$ at about 71°, the angle $\theta_3$ between the magnetic pole unit $147_1$ and the magnetic pole unit $148_1$ at about 60°, and the angle $\theta_4$ between the magnetic pole unit $148_1$ and the magnetic pole unit $149_1$ at about 60°.

Moreover, the toner supply unit $134_1$ has a configuration in which there is a hopper $151_1$ with the toner supply opening $150_1$ that faces the developer housing unit $138_1$ of the developing mechanism unit $133_1$, a toner supply roller $152_1$ which is provided in the hopper $151_1$ under a condition of blocking the toner supply opening $150_1$, and a pair of stirring rollers $153_1$ and $153_1$ which stir the toner $G_1$ in the hopper $151_1$ so as to transport the toner $G_1$ to the side of the toner supply roller $152_1$.

Still further, the second developing apparatus $132_2$ has substantially the same basic configuration as the first developing apparatus $132_1$. However, differences exist in the form of the hopper $151_2$ of the toner supply unit $134_2$, the arrangement structure of the magnetic poles for the magnetic roll $143_2$ of the developing roller $131_2$, the mounting position of the developer concentration detector $142_2$, and the resulting attachment of a narrow (width of about 50 mm) scraper 154 with an inclination of about 20°. Accordingly, other identical component parts are given suffix "2" in place of "1" in the foregoing description to omit detailed explanation. Further, the magnetic roll $143_2$ of the developing roller $131_2$ has four magnetic pole units $145_2$ to $148_2$. Of these, the magnetic pole units $145_2$ and $147_2$ are N poles and the magnetic pole units $146_2$ and $148_2$ are S poles. The angle $\theta_5$ between the magnetic pole units $145_2$ and $146_2$ is set at about 78°, the angle $\theta_6$ between the magnetic poles $146_2$ and $147_2$ is set at about 78°, and the angle between the magnetic pole units $\theta_7$ is set at about 80°. Further, the magnetic roll $143_2$ is provided under the condition whose center is located on a line $L_3$ which passes the center of rotation of the photosensitive body 107 and makes an angle of $\beta$ (about 1°) with respect to the horizontal line $L_1$.

Figure 6:
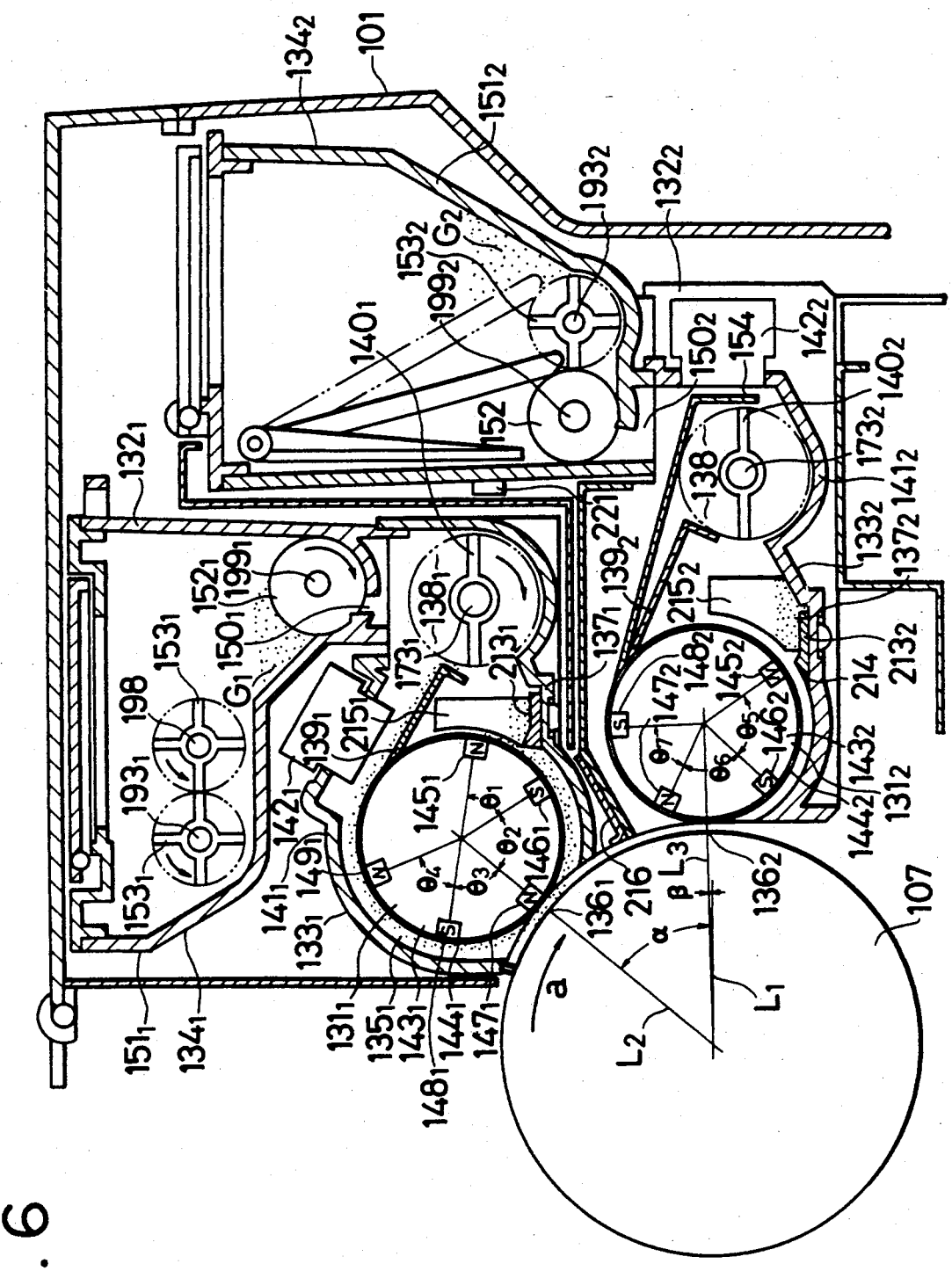
FIG. 6 is a schematic longitudinal side view of the developing device.

On the other hand, the magnetic rolls $143_1$ and $143_2$ of the first developing apparatus $132_1$ and the second developing apparatus $132_2$ are constructed respectively so as to be rotatable for the rotation angle of about 25°, and accompanying the operation of such turning displacements it is arranged to form or remove the developer magnetic brushes $135_1$ and $135_2$ on the surfaces of the developing rollers $131_1$ and $131_2$. Namely, in operating the first developing apparatus $132_1$, the magnetic roll $143_1$ on the first developing apparatus $132_1$ side is oriented so as to have the midpoint between the magnetic pole units $145_1$ and $146_1$ face the doctor $137_1$ under the condition that the magnetic pole unit $147_1$ faces the developing position $136_1$ as shown in FIG. 6. Then, the developer magnetic brush $135_1$ will be formed only on the surface of the developing roller $131_1$ which is on the side of the first developing apparatus $132_1$.

Figure 7:
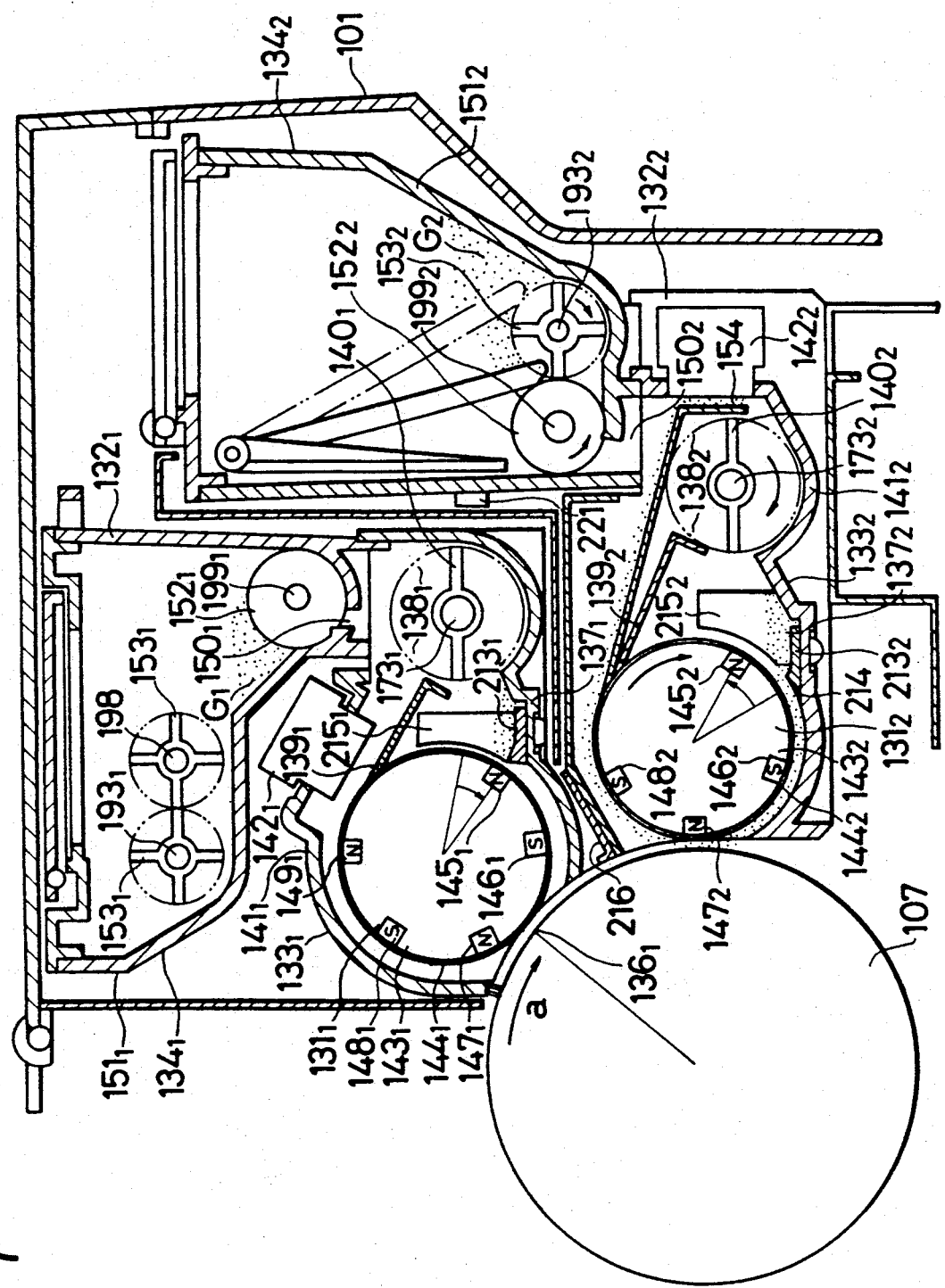
FIG. 7 is a schematic longitudinal side view for showing a different operational condition of the developing device.

Further, to operate the second developing apparatus $132_2$ side, as shown in FIG. 7, the magnetic roll $143_1$ on the first developing apparatus $132_1$ side is displaced by about 25° in clockwise direction from the position shown in FIG. 6, to let the magnetic pole unit $145_1$ face the doctor $137_1$. At the same time, the magnetic roll $143_2$ on the second developing apparatus $132_2$ side is turned by about 25° in counterclockwise direction from the position shown in FIG. 6, to let the midpoint of the magnetic pole units $145_2$ and $146_2$ face the doctor $137_2$. Then, the developer magnetic brush $135_2$ will be formed only on the surface of the developing roller $131_2$ which is on the second developing apparatus $132_2$ side.

It should be mentioned that the reason for not forming developer magnetic brushes $135_1$ and $135_2$ on the surfaces of the developing rollers $131_1$ and $131_2$, when the magnetic pole units $145_1$ and $145_2$ of the magnetic rolls $143_1$ and $143_2$ are faced the doctors $137_1$ and $137_2$ that are made of nonmagnetic materials, is as follows. Namely, the positions of the magnetic pole units $145_1$ and $145_2$ are in the state of low density of the magnetic brush with weak power for adsorbing the toners $G_1$ and $G_2$, so that it is easy to regulate the magnetic brush with the doctors $137_1$ and $137_2$. Therefore, even with the rotation of the sleeves $144_1$ and $144_2$, toners $G_1$ and $G_2$ will not pass through the doctors $137_1$ and $137_2$.

Now, the doctor $137_2$ consists, as shown in FIGS. 6 and 7, of the body of the doctor $213_2$ made of a nonmagnetic material, a magnetic body 214 made of bandlike iron plate that is provided along the longitudinal direction of the body of the doctor $213_2$, and magnetic bodies $215_2$ and $215_2$ (only one of them is shown in the figures) made of iron plate that are provided on both ends of the body of the doctor $213_2$. In removing the developer $G_2$ from the surface of the developing roller $131_2$, with the magnetic pole unit $145_2$ facing the doctor $137_2$, the magnetic bodies $213_2$ and $215_2$ form magnetic lines of force between the magnet pole unit $145_2$, to obstruct more reliably the removal of the developer $G_2$. Further, the doctor $137_1$ consists of the body of doctor $213_1$, and magnetic bodies $215_1$ and $215_1$ (only one of them is shown in the figures) made of iron plate and provided on both ends of the body of doctor $213_1$. Analogous to the case of the doctor $137_2$, removal of the developer $G_1$ is obstructed. In the doctor $137_1$, there is not provided a magnetic body along the longitudinal direction of the body of doctor $213_1$, as is done in the doctor $137_2$. Instead, removal of the developer $G_1$ is prevented by utilizing the magnetic lines of force that are formed between the magnetic pole unit $145_1$ of the developing roller $131_1$ and the magnetic pole unit $148_2$ of the developing roller $131_2$.

Moreover, as shown in FIGS. 6 and 7, between the developing rollers $131_1$ and $131_2$, there is provided a magnetic plate 216 which dilutes the influence of the magnetic flux density or pole distribution on the other magnetic roll $143_1$ (or $143_2$) to realize a satisfactory transportation of the developer.

Next, referring to FIG. 8, the positive to positive (abbreviated as P→P hereinafter) development and the negative to positive (abbreviated as N→P hereinafter) development in the developing device 110 will the described. FIG. 8 is an explanatory diagram for illustrating the operations of the P→P and N→P developments. In FIG. 8, those operations listed inside the rectangles indicate the P→P development operations, and only the operations for the N→P development that differ from those of the P→P development are listed within circles.

Figure 9A:
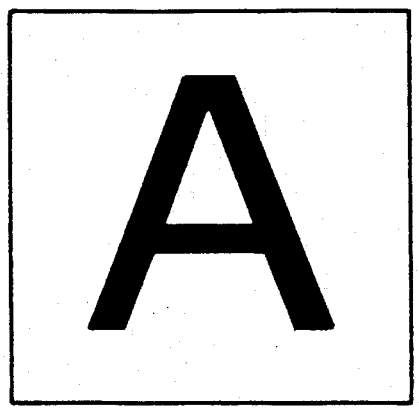
Figure 9B:
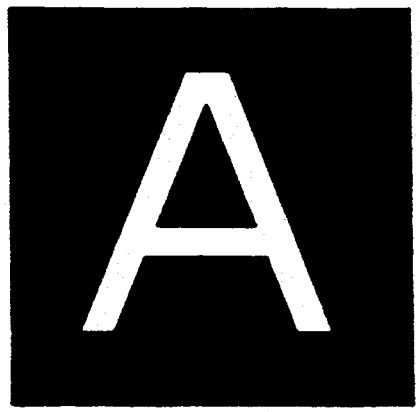

First, the P→P development will be described. In carrying out the P→P development, the first developing apparatus $132_1$ alone is set to the operating condition according to the operation of the developing device 110 described in the above, by pressing the P - P selection key, that will be described later, located on the operating panel 2. For the P→P development, the charger 108 is arranged, with a surface potential of 800 V, to positively charge the photosensitive body 107. Thereafter, the scanning light for the microfilm 5 is irradiated on the photosensitive body 107 via the scanning light guiding unit 50, by the scanning of the rotating mirror 34. Here, as shown in FIG. 9 (A), the projected light (scanning light) for the positively recorded microfilm is irradiated on the photosensitive body 107 corresponding to the portions other than the letter A. Consequently, the surface potential on the photosensitive body 107 corresponding to the parts other then the parts of the letter A is attenuated, and the surface potential on the photosensitive body 107 that corresponds to the parts of the letter A alone survives. As a result, there is formed an electrostatic latent image corresponding to the letter A on the microfilm. On the other hand, the magnetic roll $143_1$ in the first developing apparatus $132_1$ is applied a bias voltage of 230 V, and the toner and the carrier in the development mechanism unit $133_1$ are frictionally charged negatively and positively, respectively, in accordance with the charging sequences for both materials. Then, the toner that is transported together with the carrier along the periphery of the sleeve $144_1$ is adsorbed to the surface of the photosensitive body 107 due to the Coulomb force by being placed facing the electrostatic latent image on the surface of the photosensitive body 107, achieving explicit bringing-out of the electrostatic latent image.

On the other hand, paper P which is supplied by the paper feeding cassette 4 is led to the charger for transfer 111, synchronized by the resisting rollers 118. As it rotates, the photosensitive body 107 arrives at the charger for transfer 111, and the image on the photosensitive body 107 is transferred to the paper P by the charger for transfer 111 at the position of the image formation unit 116. Here, the voltage applied to the charger for transfer 111 is set at DC 5.4 kV. Thereafter, the paper P is detached from the photosensitive body 107 by the charger for detachment 112. In this case, the charger for detachment 112 is driven by AC 4.1 kV. Following that, the paper P is led by passing the paper transporting route 117 to the heating rollers 119 where the transferred image is fixed by melting, and is then ejected to the tray for ejected papers 104 by the paper ejecting rollers 120. This completes the P→P development.

Next, the N→P development will be described. In carrying out the N→P development, the second developing apparatus $132_2$ alone is set to the operating condition in accordance with the operation of the developing device described in the foregoing, by pressing the N - P selection key, that will be described later, located on the operating panel 2. In the N→P development, the charger for charging 108 charges the photosensitive body 107 positively, with a surface potential of 800 V. After that, the scanning light from the microfilm 5 is irradiated via the scanning light guiding unit 50 on the photosensitive body 107, by the scanning with the rotating mirror 34. In printing and development, the irradiated parts are shielded as will be described later, so that, in order not to have the irradiation of the scanning light on the photosensitive body 107 except for those parts to be printed, the shutter solenoid 361 is turned on, and the shutter mechanism 360 is moved in the direction of the arrow C in FIG. 5. Here, the projection light (scanning light) for a negatively recorded microfilm as shown in FIG. 9 (B), is to be irradiated on the photosensitive body 107 corresponding only to the parts of the letter A. Accordingly, the surface potential on the photosensitive body 107 that corresponds to the parts of the letter A is attenuated, and the surface potential on the photosensitive body 107 that corresponds to the parts other than those for the letter A survives. To the magnetic roller $143_2$ in the second developing apparatus $132_2$ a bias voltage of 400 V is applied, and the toner and the carrier in the development mechanism unit $133_2$ are frictionally charged positively and negatively, respectively, in accordance with the charging sequences for both materials. Accordingly, the region (where the surface potential is attenuated) that corresponds to the parts of the letter A of the photosensitive body 107, becomes charged apparently negative with respect to the magnetic roller $143_2$, and the toner which is charged positively with respect to the region is adsorbed by the Coulomb force. As a result, on the surface of the photosensitive body 107, there is carried out development that corresponds to the letter A. After that, the photosensitive body 107 arrives by rotation at the pre-transfer charge removing lamp 109, and removal of charge prior to transfer is carried out. This is because the paper P tends to be charged negatively ordinarily, and in the N→P development, the surface potential of the area on the photosensitive body 107 other than the developed region is kept high, so that the development of the paper P from the photosensitive body 107 cannot be carried out satisfactorily without charge removal prior to transfer. That is, charge removal prior to transfer is to enhance the detachment effect of the paper. Next, image on the photosensitive body 107 is transferred to the paper P by the charger for transfer 111 at the position of the image formation unit 116. Here, to transfer the toner which is charged positively, a voltage of −5.0 kV is applied to the charger for transfer. Next, the paper P is detached from the photosensitive body 107 by the charger for detachment 112. In this case, charger for detachment 112 is driven by a voltage of AC 4.5 kV plus DC 10 kV that is shifted to the positive voltage side compared with the case of the P——→P development, to enhance the development effect. Hereafter, the paper P is ejected to the tray for ejected papers analogous to the case of the P→P development. In addition, the kinds of toner used for the P→P development and the N→P development are different so that the heating temperature and the applied pressure for the heating rollers 119 may be arranged to be varied according to the type of development, to obtain the optimum fixing of the toner.

Now, in the present embodiment, both of the first developing apparatus $132_1$ for the P→P development and the second developing apparatus $132_2$ for the N→P development are mounted side by side. However, if the mode of operation is switched to the other one while the device is carrying out development scanning to one mode, there will be generated inconveniences due to switching of the polarity for various kinds of units. In order to prevent such inconveniences, selection of the P - P and N - P selection key on the operating panel to be described later is arranged in this embodiment to be impossible to be carried out while development is proceeding.

Moreover, in the present embodiment, at the first printing after switching from the P→P development to the N→P development, or vice versa, it is arranged to prevent the occurrence of consecutive operation of the P→P development and the N→P development within a short time, by a blank shifting of, for instance, one rotation of the photosensitive body 107. This is because after one mode of development is carried out, there remains positive or negative history on the photosensitive body 107 so that it is necessary to erase the history by shifting the timing of the copying.

Figure 10:
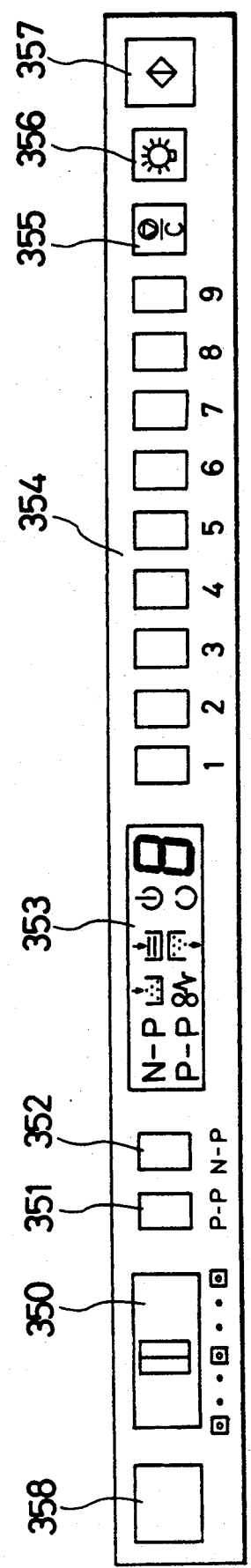

Next, referring to FIG. 10, the operating panel 2 will be described. In FIG. 10, 350 is an exposure adjusting volume, 351 and 352 are P - P development selection key and N - P development selection key, respectively, and 353 is a display board. Further, 354 is a print number setting key, 355 is a clear-stop key, 356 is a standby key, 357 is a print start key, and 358 is a main switch. On the display board 353, there are displayed, based on signals from various sensors or the like, N→P display, P→P display, toner supply display, paper supply display, paper jamming display, waiting display, print enable display, number of prints display, and so on. In addition, the main switch 358 is a switch for starting the drive of the microfilm reader/printer. By turning the main switch on, the light source 11 in the film setting unit 10 is turned on to make the projection possible, and also turns on the heater in the image formation unit 100. Further, by turning on the standby key 356, the light source 11 alone is turned off. This is for excluding wasteful projection caused by turning the light source 11 on, during warm-up of the heater in the image formation unit 100 which takes some time. Keeping the light source 11 lighted for a long time has a harmful effect of raising the temperature as well as a drawback of reducing markedly the life of the light source 11.

Figure 11B:
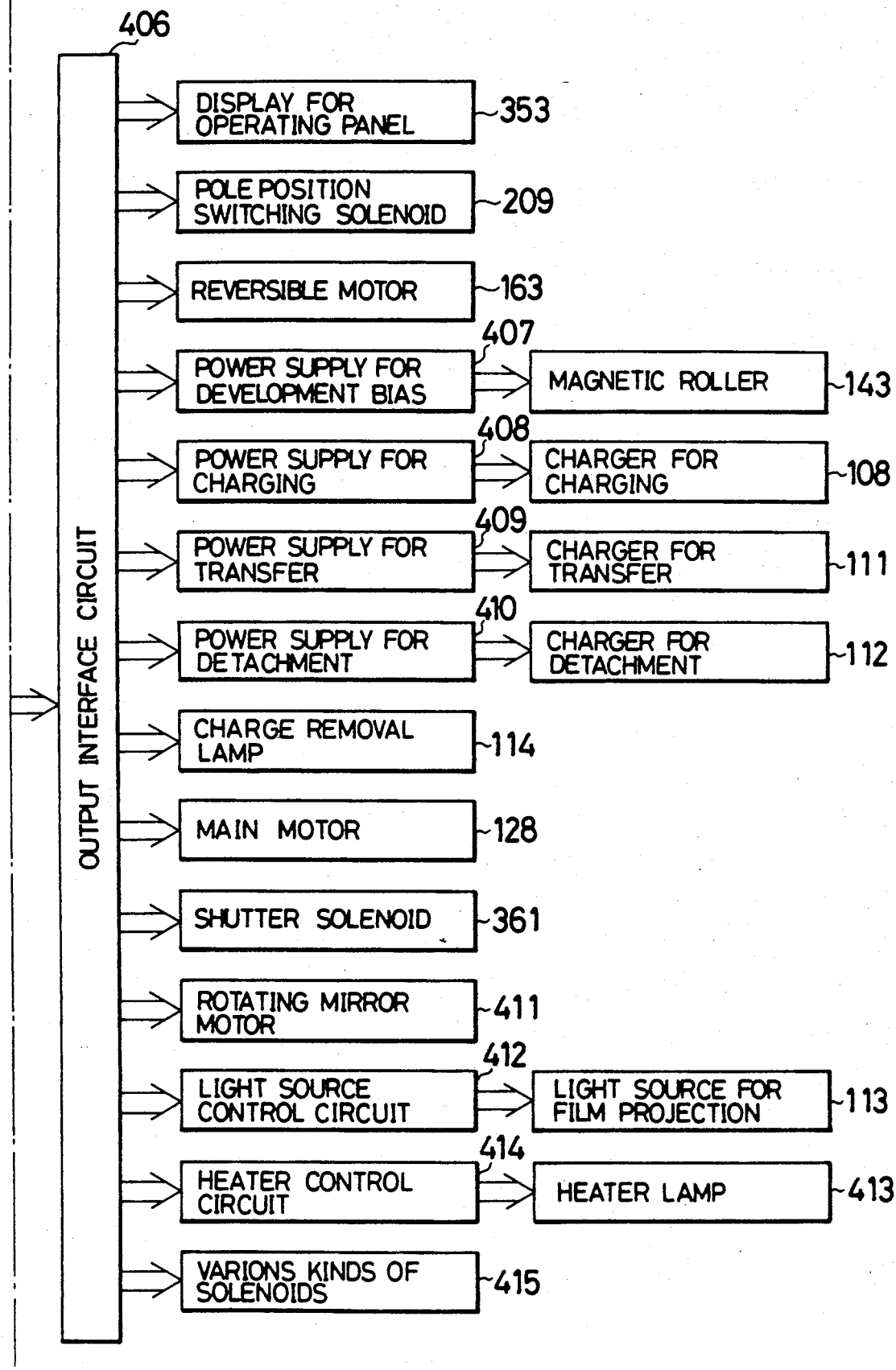

Next, referring to FIG. 11, the control circuit will be described.

Reference numeral 400 is a microcomputer as the principal control unit which controls the reader/printer as a whole. To the microcomputer 400, via an input interface circuit 401 such as data select, there are connected input switches 402 such as various kinds of keys 351, 352, 354 to 357, and so on, various kinds of sensors and switches 403 that are needed for control, the developer concentration detector $142_1$, a residual developer detector $404_1$, and a signal generating means for developer presence or absence $405_1$ for the first developing apparatus $132_1$, and the developer concentration detector $142_2$, residual developer detector $404_2$, a signal generating means for developer presence or absence $405_2$, and others for the second developing apparatus $132_2$. Further, to the microcomputer 400, via an output interface circuit, there are connected various kinds of display 353 for the operating panel 2, solenoid 209 for switching the positions of the poles for the first and second developing apparatus $131_1$ and $131_2$, the reversible motor 163, a power supply for development bias 407 for magnetic rolls $143_1$ and $143_2$ of the first and second developing apparatus $132_1$ and $132_2$, a power supply for charging 408 for the charger for charging 108, a power supply for transfer 409 for the charger for transfer 111, a power supply for detachment 410 for the charger for detachment 112, the charge removing lamp 114, the main motor 128, the shutter solenoid 361, a motor for reciprocating motion 411 for the rotating mirror 34, an on-off switch for the light source for film projection 113, a light source control circuit 412 for controlling the applied voltage, a heater lamp 413 serving as a heating means so as to keep the surface temperature of the heating rollers at a constant value, a heater control circuit 414 for controlling the on-off of the heater lamp 413, various kinds of solenoids 415, and so forth.

Figures 12A, 12B:
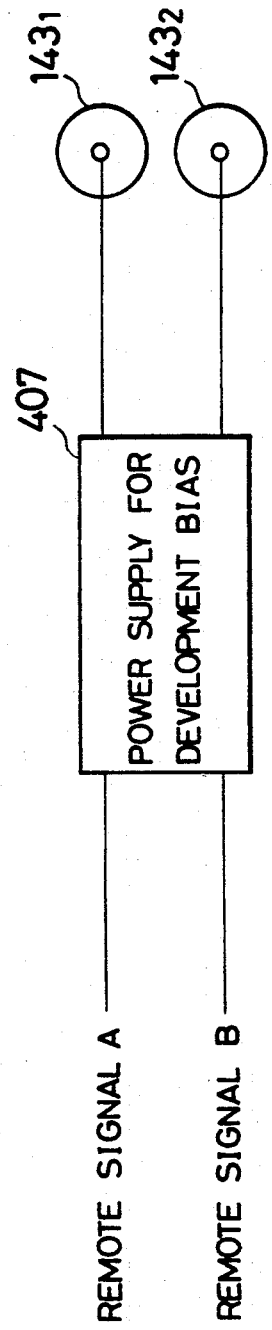
Figures 14A, 14B:
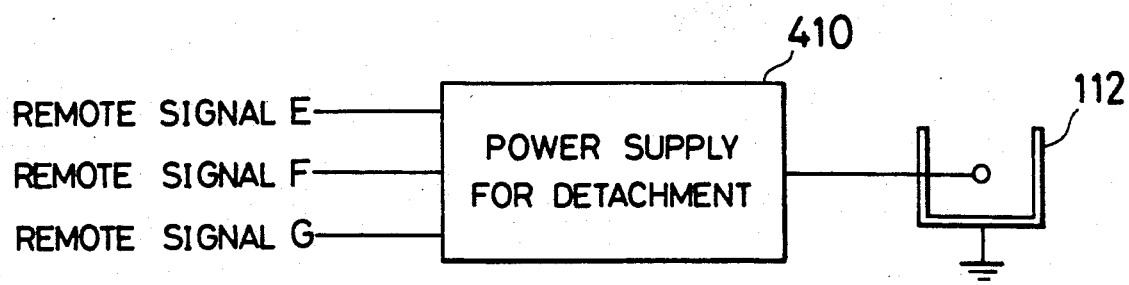
Figures 15A, 15C:
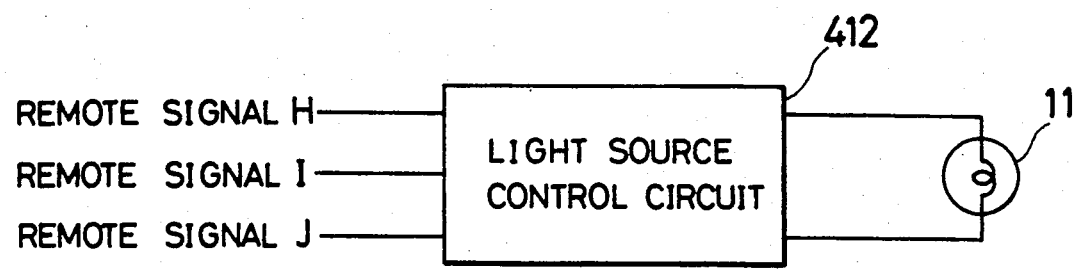

The input remote signals for the power supply for development bias 407 have 2-bit construction as shown, for instance, in FIGS. 12 (A) and 12 (B), and can switch, based on the combination of signals, the voltages to be applied to the magnetic roll $143_1$ for the first developing apparatus $132_1$ and the magnetic roll $143_2$ for the second developing apparatus $132_2$, as shown, for instance, by the truth table in FIG. 12 (B). Here, a voltage of 0 V is applied to the magnetic roll $143_2$ of the second developing apparatus $132_2$ in the case of P - P development, and a voltage of 400 V is applied to the magnetic roll $143_1$ of the first developing apparatus $132_1$ in the case of N - P development. By arranging in this way, it becomes possible to prevent a development through the developing apparatus which is not in use, even when the developer is not completely removed from the developing apparatus which is in use. The configuration and the truth table for the power supply for transfer 409 and the power supply for detachment 410 are shown in FIGS. 13 and 14, respectively. As shown in the figures, the voltages applied to the charger for transfer 111 and the charger for detachment 112 can be switched based on the combinations of the input signals. In addition, the configuration and the truth table for the light source control circuit 412 are shown in FIGS. 15 (A), 15 (B), and 15 (C). Namely, as shown in FIG. 15 (C), the light source control circuit 412 turns off the light source 11 if the power saving mode is in on-state even when the on/off mode for the power supply is turned on. The concrete truth table for this operation is as shown in FIG. 15 (B). That is, the light source 11 can be turned on or off by the remote signal H. When the remote signal H is turned on and the remote signals I and J are turned off, the applied voltage to the light source 11 can be switched to P - P development mode (referred to as the print mode hereinafter), when the remote signals H and J are turned on and the remote signal I is turned off, there is obtained the N - P development mode (referred to as the N - P mode hereinafter), and when the remote signals H and I are turned on, switched to the screen projection mode (referred to as the screen mode hereinafter). The light source control circuit 412 is connected electrically to the exposure adjusting volume 350 on the operating panel 2, and has a circuit structure such that the applied voltage to the light source 11 can be raised by moving the slider for the exposure adjusting volume 350 in FIG. 10 toward left for the P - P mode and toward right for the N - P mode. With such a circuit configuration, it is possible to brighten the printed image by moving the slider for the exposure adjusting volume 350 on the operating panel 2 toward left in FIG. 10 for either case of the P - P and N - P developments, and to darken it by moving the slider toward the right. Further, the configuration is given such that a light source 11 with constant intensity can be obtained for the screen mode irrespective of the motion of the slider for the exposure adjusting volume 350. The block diagram and the table shown in FIGS. 16 (A) and 16 (B) are the heater control circuit and the truth table. The heater control circuit controls the heater lamp in three stages by the combination of the two signals that are input to the input side of the circuit, as indicated by the truth table shown in FIG. 16 (B). Namely, when the on-signal shown in the figure is in off-state, the heater lamp is in off-state regardless of the signal for power saving, while when the on-signal is on-state, its condition, that is, the set temperature for the heater lamp, is arranged to be maintained by the power saving signal at 200° C. or at 160° C. of the set temperature for power saving mode.

Next, referring to the flow charts shown in FIGS. 17 (A) to 17 (D), the operation of the system with the above configuration will be described.

First, when the power supply is turned on, it proceeds to step A1. In step A1, in order to carry out the film projection operation onto the screen within the interruption processing that will be described later, the flag A is set to "1", and the heater lamp 413 of the heating rollers 119 is turned on, to proceed to step A2. In step A2, the pole position switching solenoid 209 is turned on to proceed to step A3. In step A3, the main motor 128 is turned on, the reversible motor 163 is rotated in the reverse direction, and the charge removing lamp is turned on, to proceed to step A4. Then, the second developing apparatus 132$_2$ is driven and developer magnetic brush 135$_2$ formed on the surface of the developing roller 131$_2$. In step A4, the remote signals E, F, and G of the power supply for charging 408 and the power supply for detachment 410 are turned on, and proceeds to step A5. In step A5, with timing such that the point from which charging on the photosensitive body 107 is started, arrives at the developing position 136$_2$ of the second developing apparatus 132$_2$, the remote signals A and B of the power supply for development bias 407 are turned on, to proceed to step A6. In step A6, the pole position switching solenoid 209 and the power supply for charging 408 are turned off. In step A7, with timing such that the point at which the charging on the photosensitive body 107 is completed in step A6, arrives at the developing point 136$_2$ of the second developing apparatus 132$_2$, the power supply for development bias 407 is turned off, to proceed to step A8. In step A8, the reversible motor 163 and the power supply for detachment 410 are turned off, and proceed to step A9. Then, the developer magnetic brush 135$_2$ is removed from the surface of the developing roller 131$_2$ of the second developing apparatus 132$_2$. In step A9, it proceeds to step A10 by turning on the pole position switching solenoid 209 of the first developing apparatus 132$_1$. In step A10, the reversible motor is rotated in the forward direction to proceed to step A11. Then, the first developing apparatus 132$_1$ is driven and a developer magnetic brush 135$_1$ is formed on the surface of the developing roller 131$_1$. In step A11, the remote signal E of the power supply for detachment 410 is turned off before proceeding to step A12. In step A12, it proceeds to step A13 by rotating the resisting rollers 118. In step A13, whether or not there is a paper on the paper path is checked by a sensor or the like that is provided on the paper path for detecting the presence or absence of the paper, and it proceeds to step A14 if the presence is checked. In step A14, it is checked whether a predetermined time has elapsed after the resisting rollers are rotated. What is meant by a predetermined time is time which is sufficient for completely ejecting the paper from the device. If the predetermined time did not elapse yet, it proceeds to step A13. Further, if the predetermined time did not pass, it means that there occurred a jamming of a paper so that a processing for the abnormality need be given. On the other hand, in step A13, if it is found that there is no paper on the paper path, it proceeds to step A15. In step A15, the pole position adjusting solenoid 209 is turned off to proceed to step A16. In step A16, the main motor 128, reversible motor 163, charge removing lamp 114, power supply for detachment 410, and resisting rollers 118 are brought to stop before proceeding to step A17. Then, the developer magnetic brush 135$_1$ is removed from the surface of the developing roller 131$_1$ of the first developing apparatus 132$_1$. In step A17, it is checked, by the signal generating means for developer presence or absence 405$_1$ and 405$_2$, whether or not at least one of the developing apparatus 132$_1$ and 132$_2$ is set, and proceeds to step A18 if both are not set. In step A18, the heater lamp is turned off and the N - P, P - P, and print enable display on the operating panel 2 are turned off so that the device is in the standby condition, namely, the printing operation is not in progress and it is in a state in which the heating rollers 119 are at a temperature which enables fixing. If at least one of the developing apparatus is set in step A17, it proceeds to step A19. In step A19, it is checked, by switches on a control PC board that is not shown, whether or not the N - P development selection be given priority If the N - P development is to be given priority, it proceeds to step A20 to select the second developing apparatus 132$_2$, and then proceeds to step A22. On the other hand, if it is determined not to give priority to the N - P development, it proceeds to step A21 to select the first developing apparatus 132$_1$, and proceeds to step A22. In step A22, it is checked whether or not warming-up of the heat rollers 119 is completed. If it is completed, it is brought to the standby condition by lighting the print enable display symbol on the operating panel 2, and in step A23, it is made ready to receive the operation of keys on the operating panel 2.

Figure 17A:
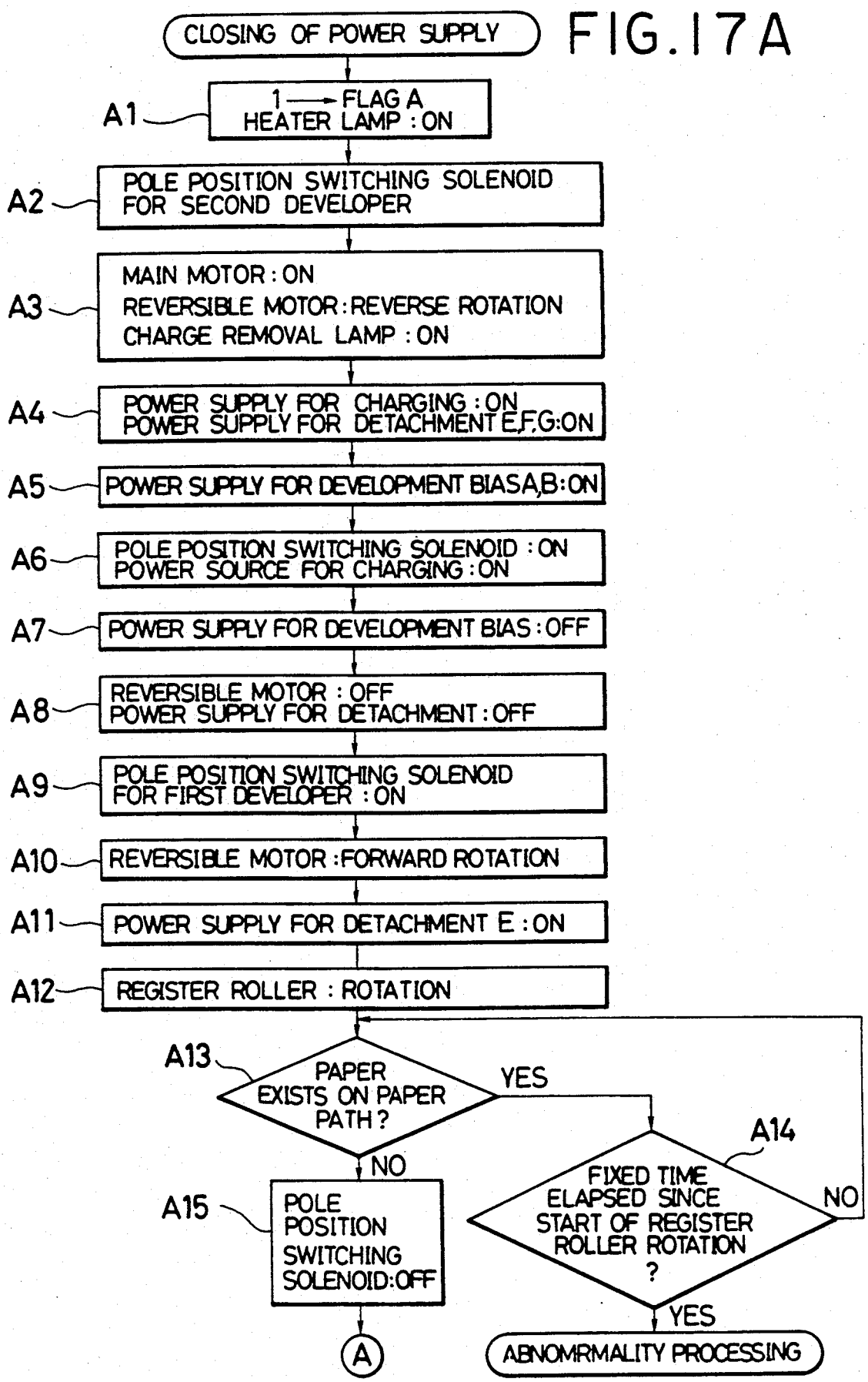
Figure 17B:
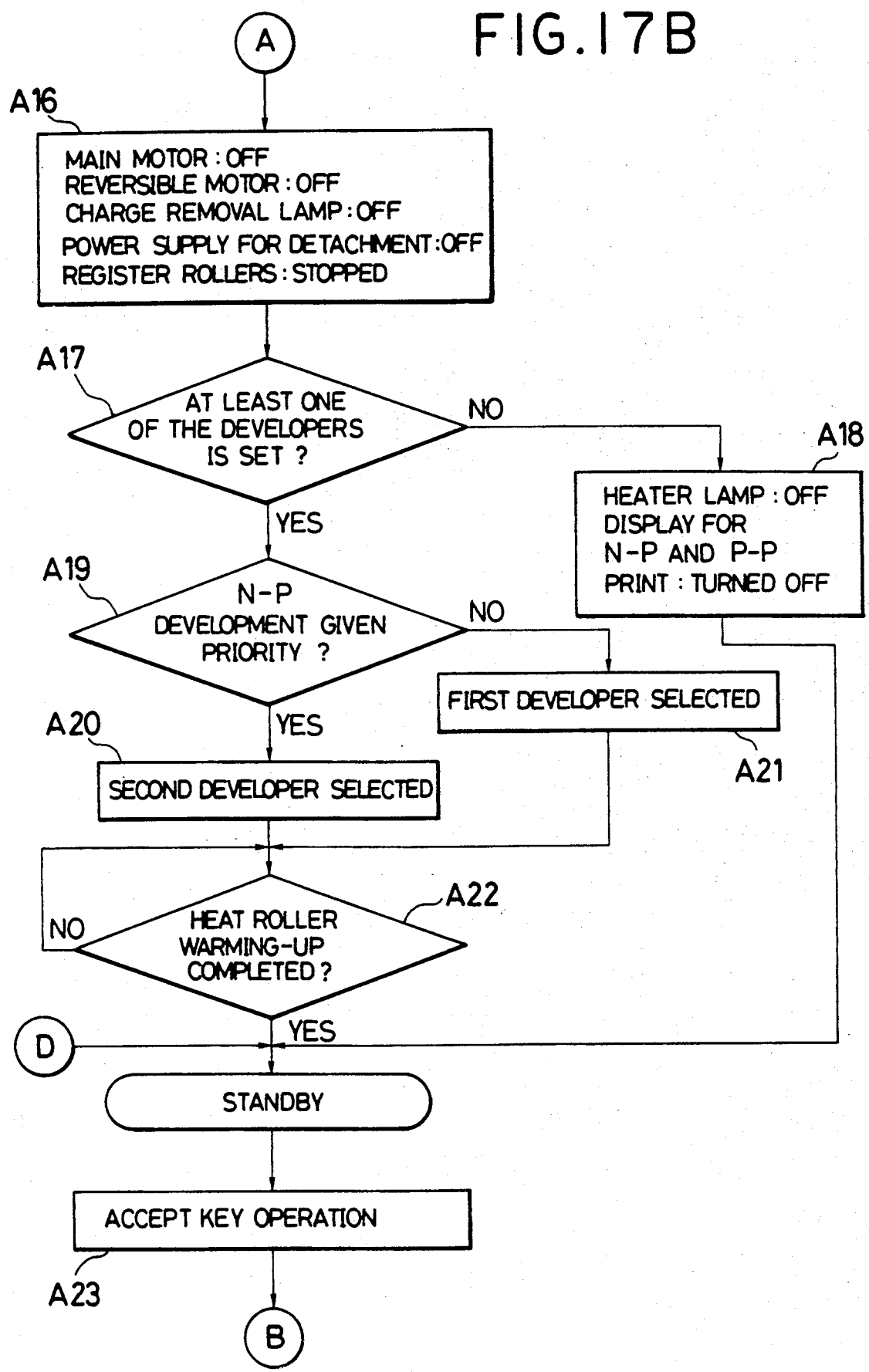

Further, when the standby key 356 which is a selection means is pressed down following step A23, as shown in FIG. 17 (C), that is, when the power saving mode is selected, the condition of the standby key 356 is checked in step A23$a$, and proceeds to step A23$b$ if it is in on-state and proceeds to step A23$c$ if it is in off-state. In step A23$b$, the lighting of the light source lamp is checked, and if it is found to be in the lit condition, it proceeds to step A23$d$ to turn off the light source lamp, turns on the power saving signal, and returns to the condition immediately before step A23$a$. If the light source lamp is not in the lit condition in step A23$b$, it returns to the condition immediately prior to step A23$a$. In this manner, by turning off the unnecessary light source lamp in the state in which the machine is not used in the standby state, namely, by selecting the power saving mode, it is possible to realize power saving. Further, by so doing, it becomes possible to prolong the life of the light source lamp, reducing the number of times of interchange of the light source lamp. On the other hand, when the standby key 356 is not pressed down in step A23$a$, after the light source lamp is turned on and the power saving signal is turned off, it proceeds to step A24. In step A24, whether or not the second developing apparatus 132$_2$ is set is checked by the developer presence or absence signal from the second developing apparatus 132$_2$, and proceeds to step A25 if it is not set. In step A25, whether or not the first developing apparatus is set is checked by the developer presence or absence signal from the first developing apparatus 132$_1$, and it returns to the standby condition when it is not set.

On the other hand, if the second developing apparatus 132$_2$ is found to be set in step A24, it proceeds to step A26. In step A26, whether or not the first developing apparatus 132$_1$ is set is checked, and it proceeds to step A27 if it is set. In step A27, it is checked whether or not the second developing apparatus is being selected currently, and it proceeds to step A28 if it is not selecting the second developing apparatus. In step A28, it is checked whether or not the N - P selection key 352 on the operating panel 2 is brought to on-state, and it proceeds to step A29 if it is in on-state or the first developing apparatus 132₁ is set in step A26. In step A29, it proceeds to step A32 by selecting the second developing apparatus. On the other hand, if the second developing apparatus is selected in step A27, it proceeds to step A30. In step A30, whether or not the P - P selection key 351 on the operating panel is brought to on-state is checked, and it proceeds to step A31 if it is in on-state or the first developing apparatus 132₁ is set in step A25. In step A31, it proceeds to step A32 by selecting the first developing apparatus 132₁. On the other hand, if the N - P selection key 52 is set to on-state in step A28, or the P - P selection key 51 is not set to on-state, it proceeds to step A32 by keeping the developing apparatus selection as is. In this manner, when both of the first developing apparatus 132₁ and the second developing apparatus 132₂ or either one of these is not set, selection of the developing apparatus in question is prohibited. In step A32, it is checked whether or not there exists abnormalities in the device, and carries out processing of abnormalities if there exist some and proceeds to step A33 if no abnormality exists. In step A33, whether or not there are papers in the paper feeding cassette 4, and it goes back to the standby condition if there exists none and proceeds to step A34 if there are some. In step A34, whether or not the print key 357 is brought to on-state is checked, and proceeds to the printing operation that will be described later if it is found in on-state and proceeds to step A35 if it is not in on-state. In step A35, whether or not operations of keys on the operating panel 2 have not been carried out for a predetermined length of time, and it returns to the standby condition if some operations have been given and proceeds to step A36 if no operation has been given. In step A36, the number of print is set to one, and returns to the standby condition.

Figure 18B:
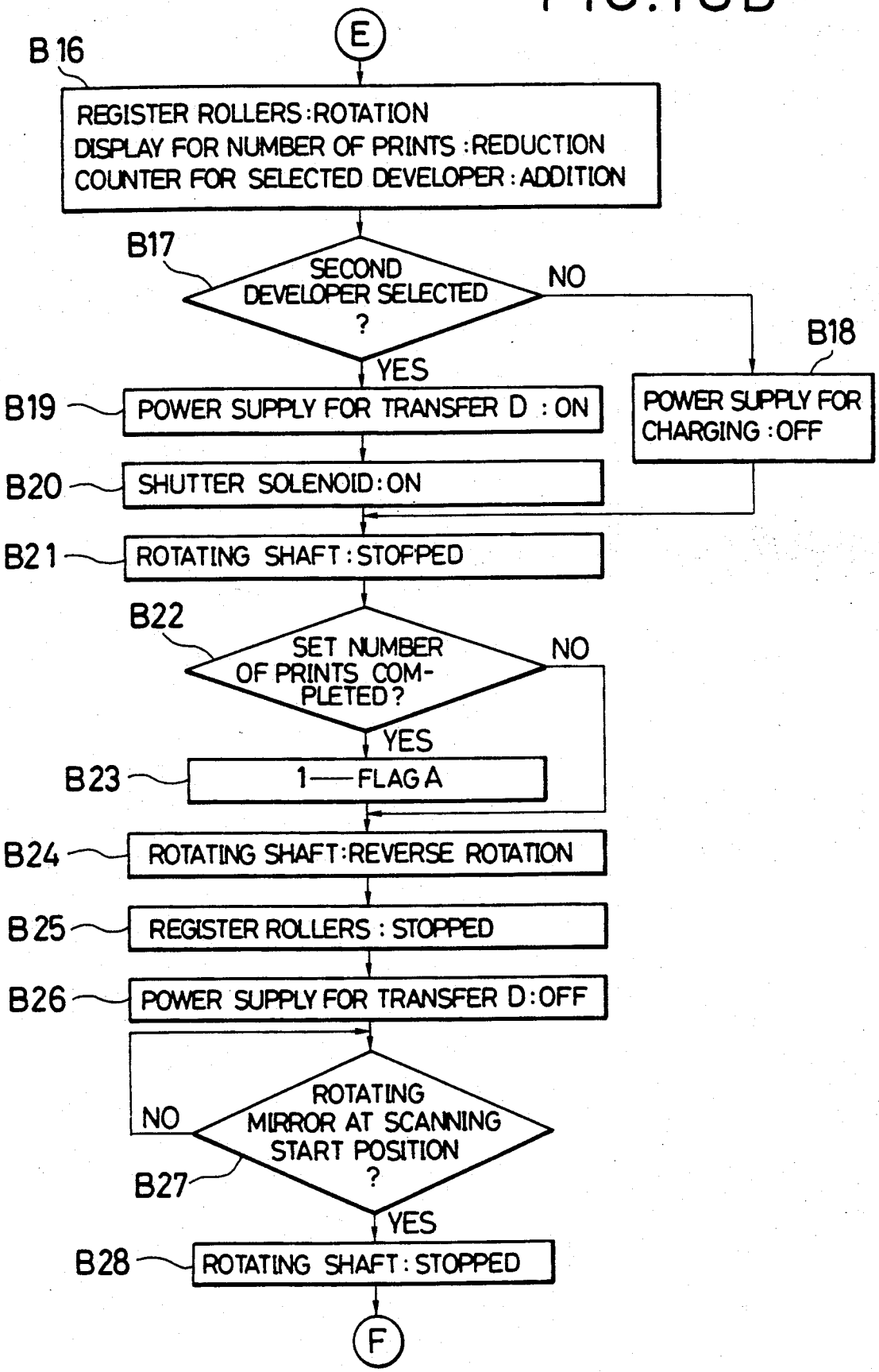
Figure 18C:
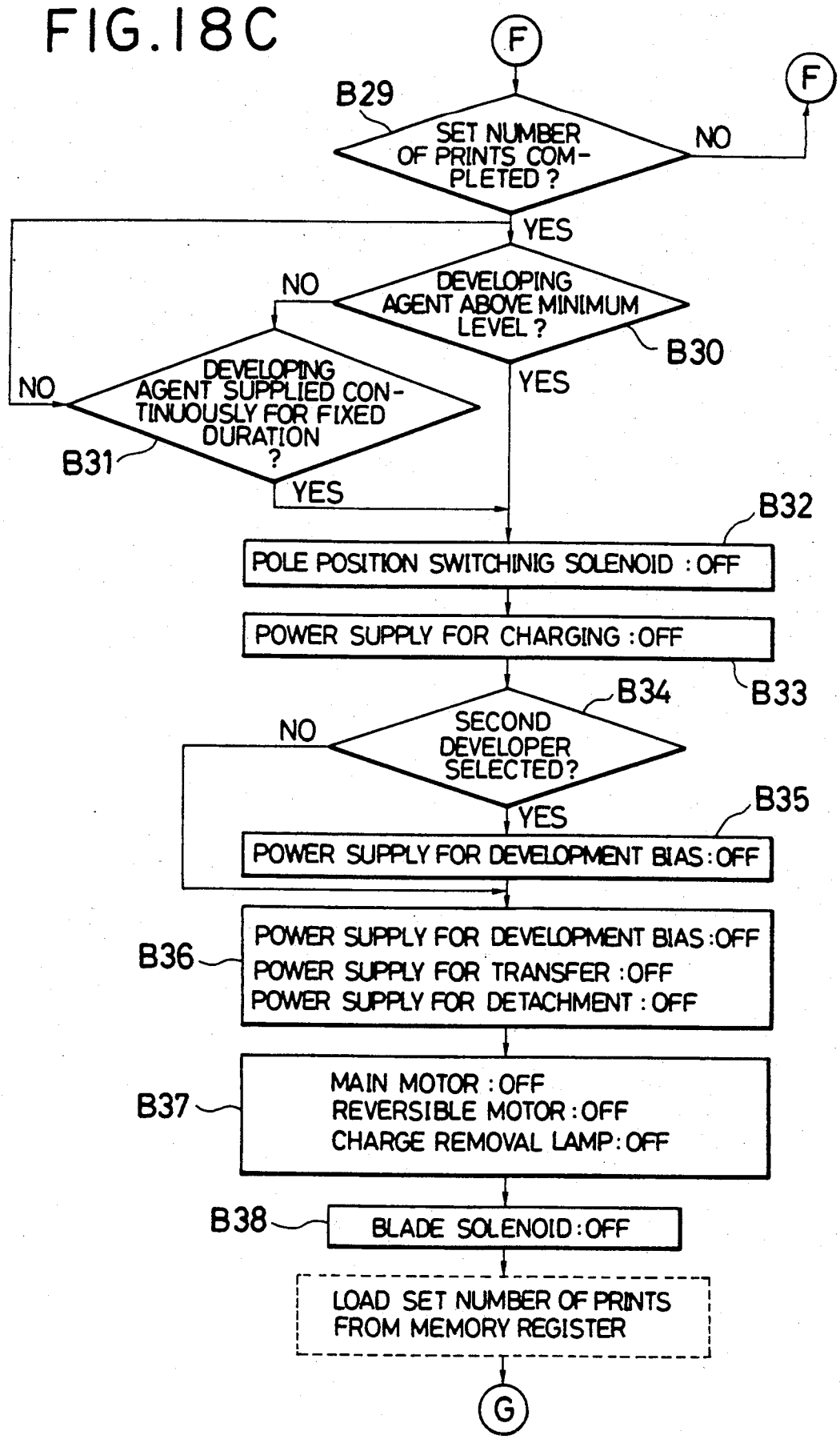
Figure 18D:
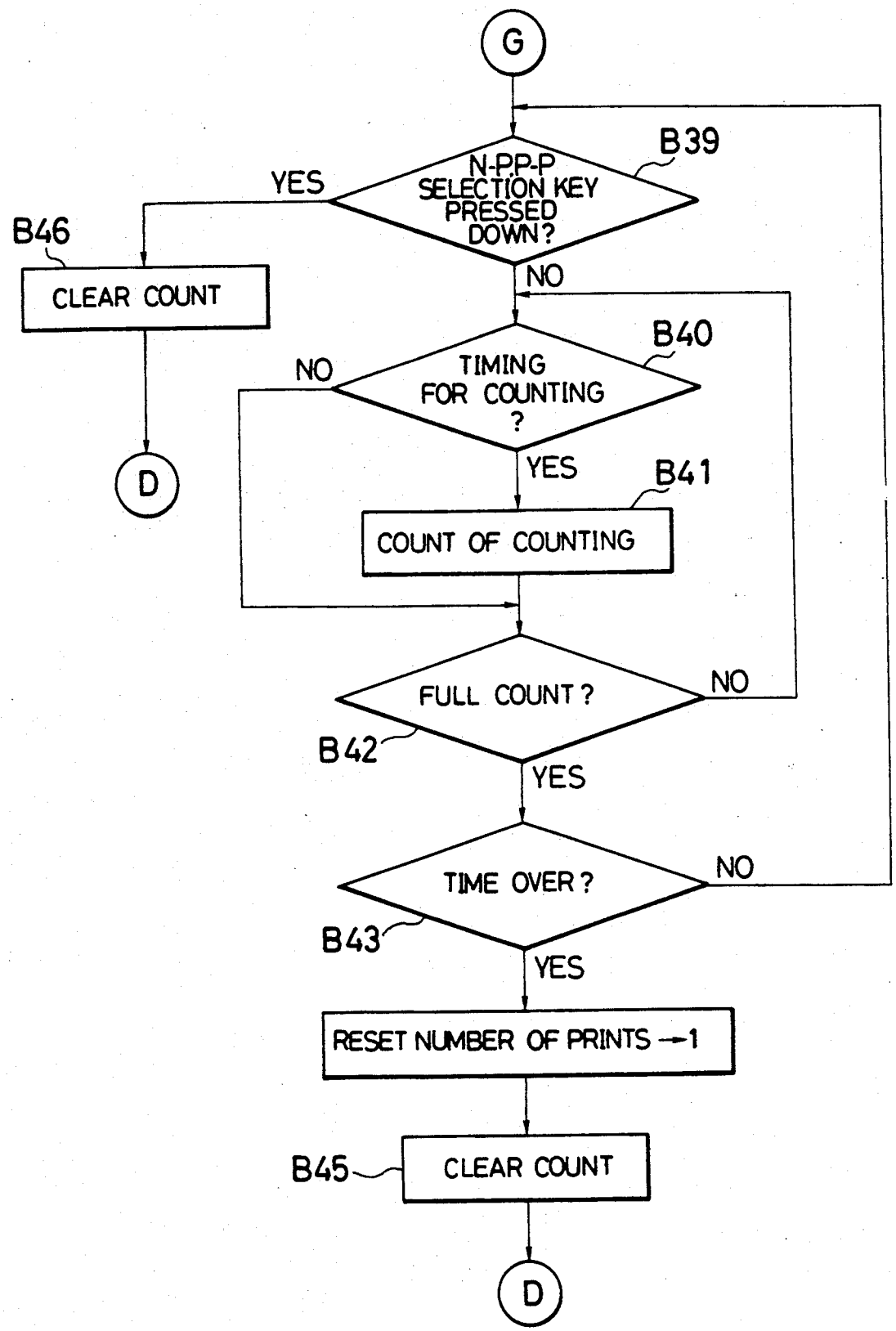

Next, by referring to the flow charts shown in FIGS. 18 (A) to 18 (D), the printing operation will be described.

When the print key 357 on the operating panel is pressed down, it proceeds to step B1. In step B1, the rotating mirror 34 is moved to the printing position within the interruption processing that will be described later, and proceeds to step B2 by setting the B flag to 1 in order to light the light source 11 in accordance with the selected printing mode. It should be noted that in the prior art, there is included a processing that saves the set number of prints in the memory register, as an intermediate step between the steps B1 and B2. However, in the present invention, the processing is eliminated. In step B2, the blade solenoid 129 of the cleaning device 113 and the pole selection switching solenoid of the selected developing apparatus are set to on-state before proceeding to step B3. In step B3, the reversible motor 163 is rotated in the direction of the selected developing apparatus, and the main motor 128 and the charge removing lamp 114 are set to on-state, to proceed to step B4. In step B4, whether or not the developing apparatus selected is the second developing apparatus is checked, and it proceeds to step B5 if the second developing apparatus is not selected. In step B5, the remote signal C of the power supply for transfer, the remote signal E of the power supply for detachment 410, and the remote signal A of the power supply for development bias are set to the on-state, respectively, and proceed to step B7. On the other hand, if the second developing apparatus is selected in step B4, it proceeds to step B6. In step B6, the power supply for charging 408, the remote signals E, F, and G of the power supply for detachment 410, and the remote signal B of the power supply for development bias 407 are set to the on-state, and proceeds to step B7. In step B7, by setting the remote signal A of the power supply for development 407 to, on-state, with timing such that the point where the charging on the photosensitive body 107 arrives at the developing position 136₂ of the second developing apparatus 132₂, it proceeds to step B8. In step B8, it is checked whether or not the rotating mirror 34 is at the scan starting position, and proceeds to step B10 if it is at the position of starting scanning. If it is not at the position of starting scanning, the rotating mirror 34 is rotated in the direction to return the rotating mirror 34 to the position of starting scanning by reversing the rotating shaft 38, namely, by rotating the rotating mirror 34 in the clockwise direction in FIG. 4, and goes back to step B8. In step B10, it proceeds to step B11 by stopping the rotating shaft 38. In step B11, whether or not the rotating mirror 34 is in the printing position is checked, and proceeds to step B12 if it is in the printing position. In step B12, paper feeding operation from the paper feeding cassette 4 is started, and proceeds to step B13. In step B13, the rotating shaft is started to rotate in the forward, namely, in the counterclockwise, direction in FIG. 4 in order to wind the steel belt 37 on the rotating shaft 38, to start the film operation, to proceed to step B14. From step B14, it proceeds to step B15 by setting the power supply for charging 408 to, on-state. From step B15, it proceeds to step B16 by setting the shutter solenoid 361 to the off-state. In step B16, the paper is sent to the image transferring unit 116 by the resisting rollers 118, the displayed content of the number of prints display on the operating panel 2 is decreased by one, the counter for the selected developing apparatus that is not shown in the figure is increased by one, and it proceeds to step B17. In step B17, whether or not the second developing apparatus is selected is checked, and it proceeds to step B18 if it did not select the second developing apparatus. From step B18, it proceeds to step B21 by setting the power supply for charging 408 to off-state. On the other hand, if the second developing apparatus is selected in step B17, it proceeds to step B19. In step B19, the remote signal D of the power supply for transfer 409 is set to the on-state, with timing such that the tip of the paper arrives at the image transferring unit 116 after rotating the resisting rollers 118 in step B16, to proceed to step B20. In step B20, the scanning light to the photosensitive body 107 is shielded by turning on the shutter solenoid 361, and it proceeds to step B21. In step B21, the motion of the rotating shaft 38 is stopped to complete the film processing, and it proceeds to step B22. In step B22, it is checked whether or not printing for set number of prints is completed, and it proceeds to step B24 if it is not yet completed or to step B23 if it is completed. In step B23, the flag A is set to 1 in order to carry out again the operation of film projection, and then proceeds to step B24. In step B24, the operation of returning the rotating mirror 34 to the starting position of scanning by reversing the rotation of the rotating shaft 38 is initiated, and proceeds to step B25. From step B25 it proceeds to step B26 by stopping the rotation of the resisting rollers 118. From step B26 it proceeds to step B27 by turning off the remote signal D of the power supply for transfer 409, with timing such that the rear end of the paper passes the image transferring unit 116, the remote signal D of the power supply for transfer 409 is turned off, and proceeds to step B27. In step B27 it checks whether or not the rotating mirror 34 is in the operation starting position, and it proceeds to step B28 if it is in the position of starting operation. From step B28 it proceeds to step B29 by bringing the rotating shaft 38 to a stop. In step B29 it checks whether or not the printing of set number of prints is completed, and it returns to step B12 to repeat the operation described in the foregoing if the printing is not completed yet. On the other hand, if the printing of set number of prints is completed in step B29, it proceeds to step B30. In step B30 it is checked whether or not the concentration of the developing agent for the selected developing apparatus is above the minimum tolerable concentration level, based on the signal from the developing agent concentration detector for the selected developing apparatus, and it proceeds to step B32 if it is found to be below the minimum level of concentration. In step B31 it is checked whether or not the developer has been supplied continuously for a predetermined length of time, and it returns to step B30 if it has not been, to repeat the above operation, and proceeds to step B32 when supply of the developer took place continuously for a predetermined length of time. From step B32 it proceeds to step B33 by turning off the pole position switching solenoid 209. From step B33 it proceeds to step B34 by turning off the power supply for charging 408. From step B34 it proceeds to step B35 if the second developing apparatus is being selected. In step B35, the power supply for development bias 407 is turned off, with timing such that the point at which charging on the photosensitive body 107 is completed in step B33 arrives at the developing position of the second developing apparatus $132_2$, and then proceeds to step B36. On the other hand, if the second developing apparatus was not selected in step B34, it proceeds to B36 by skipping step B35. In step B36, after turning off each of the power supply for development bias 407, power supply for transfer 409, and power supply for detachment 410, it proceeds to step B37. From step B37 it proceeds to step B38 by turning off each of the main motor 128, reversible motor 163, and charge removing lamp 114. In step B38, the blade solenoid 129 for the cleaning device 113 is turned off. According to the prior-art device, following the processing in step B38, there comes the processing of loading the set number of pages of prints from the memory register, as shown within the broken line in FIG. 18 (C). In contrast, according to the present invention, in addition to eliminating that step, the set number of pages of print is reset to a prescribed number of pages, for example, "1" as will be described later in step B44.

Accordingly, after completion of the printing operation, the condition which was set by the previous operator is reset automatically, so that there is no need for the next operator to reset the number on his own, and moreover, it is possible to prevent the situation of making unnecessary prints. For instance, even when an erroneous printing takes place, the prescribed number of prints is set automatically so that the memory for storing the number, commands such as retreat, storing, and return of the data become unnecessary, and results in a saving of memories.

More specifically, the number of prints set in the registering operation is reset automatically to the prescribed number of prints after an elapse of a fixed length of time so that those problems such as getting prints beyond what is needed and waste of the paper toner that were liable to occur in the prior-art device can be eliminated once and for all. In addition, the fixed length of time in the above is found preferable, after examination and experiments, to be 30 seconds, and the prescribed number of pages is found satisfactory if it is unity, for instance.

Next, in step B39, it is judged, after completion of the printing operation, whether or not the key for a printing mode, which is different from the N - P selection key 351 or the P - P selection key 352 that has been employed, is pressed down again. In step B39, if the selection key for either of the selection keys 351 and 352 that has not been used is found to be pressed down, it proceeds to step B46, and if such a key is not pressed down, it proceeds to step B40. In step B46, the number of pages of print that is set by the print number setting key 354, is reset to 1 and returns to the connector D. In step B40, it is confirmed whether or not it is the timing to count the set number of pages of print. If it is in that timing, it proceeds to step B41. If it is not in that timing, it proceeds to step B42 by skipping step B41. In step B42, it is judged whether or not the count of the set number of pages of print (the number of pages of print is set by the print number setting key 354) is equal to the set value, and it proceeds to step B43 if it equals the set value while it returns to step B40 if it is not equal. In step B41, the number of pages of print is increased by one and proceeds to step B42. In step B43, by having a time, for instance, 30 seconds, during which the operating key cannot be operated, set internally beforehand, it proceeds to step B44 when it reaches that value while it returns to step B39 when it does not. In step B44, the number of pages of print is reset to the initial value 1, and it proceeds to step B45. In step B45 it proceeds to the connector D by clearing the set number of pages of print.

In this manner, following step B39, after the completion of the printing operation, the number of pages of print is set to an appropriately prescribed number of pages in the next printing operation, by setting only the number of pages of print without returning to the priority mode. Therefore, when the operator who carried out the printing operation is to continue printing operation after elapse of a fixed length of time, it is possible to prevent the misprint that will be caused by not knowing that the printing mode is returned to the priority mode during the fixed length of time.

Figure 19A:
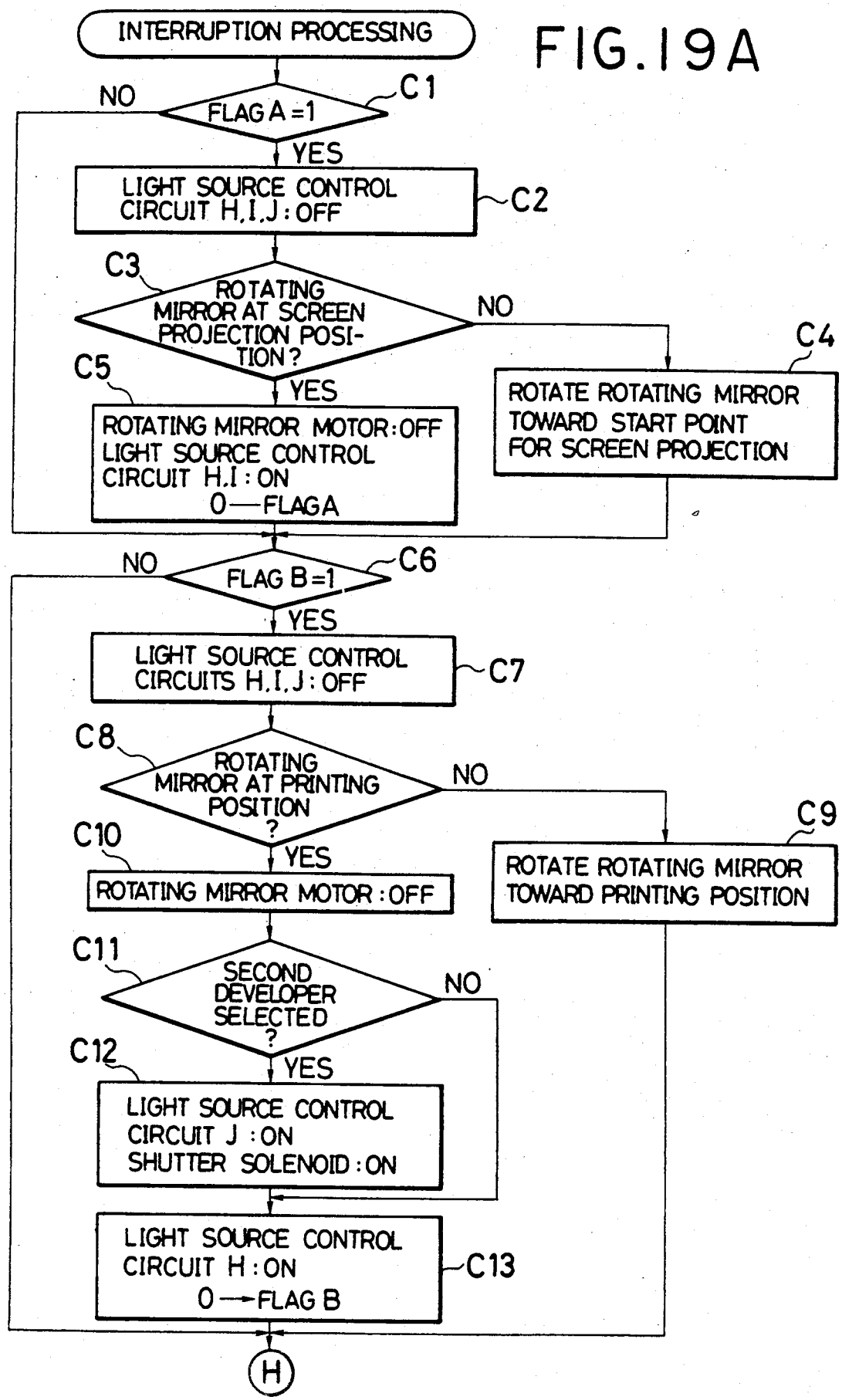
Figure 19B:
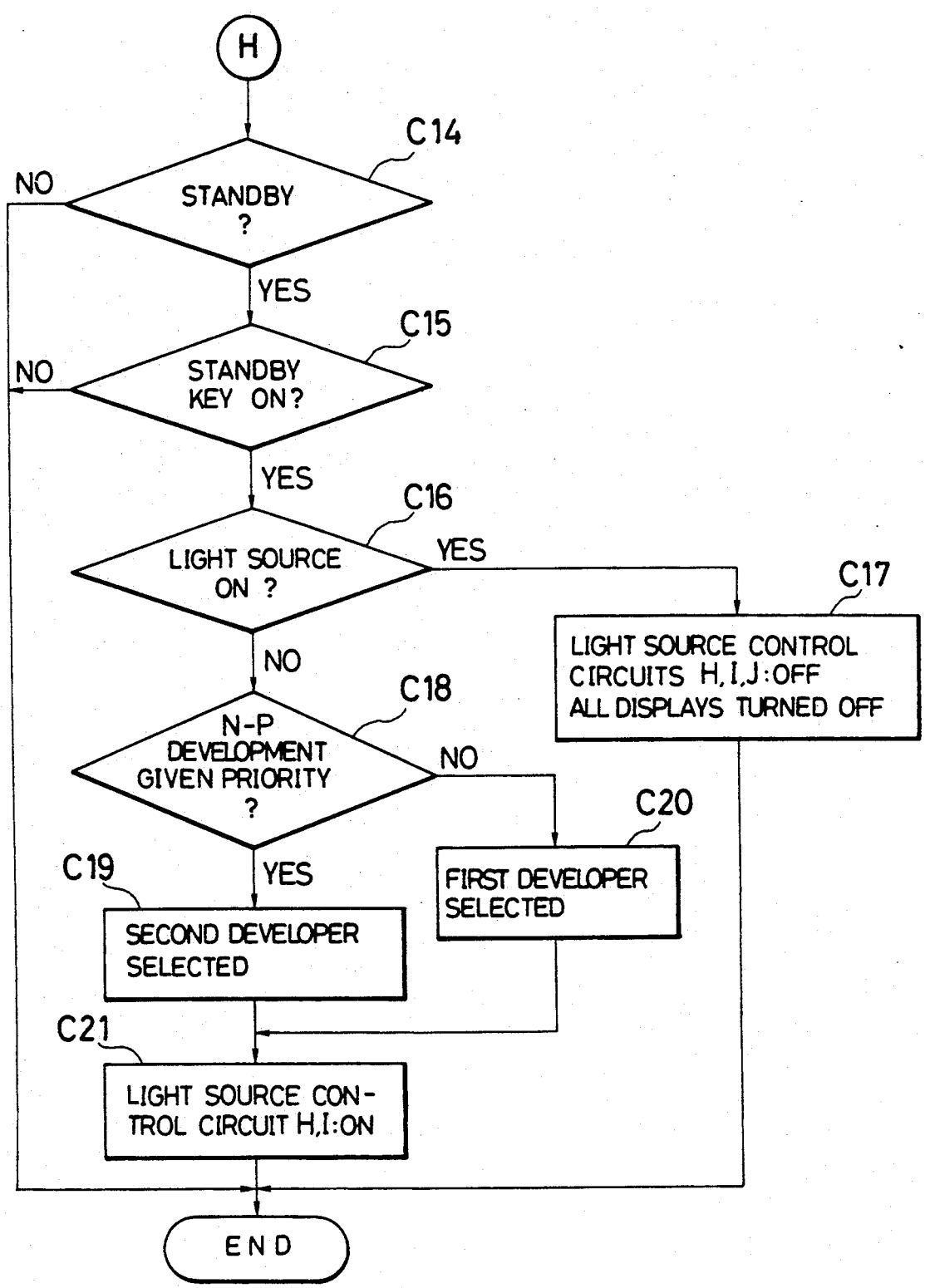

Next, referring to the flow charts shown in FIGS. 19 (A) and 19 (B), the interruption processing will be described.

The interruption processing is designed to be performed every fixed length of time. When the interruption processing is started, it proceeds to step C1. In step C1 it is checked whether or not the flag A is set to 1, and it proceeds to step C6 if it is not set to 1 while it proceeds to step C2 if it is set to 1. In step C2, the remote signals H, I, and J of the light source control circuit 412 are turned off and the light source 11 is turned off before proceeding to step C3. In step C3 it checks whether or not the rotating mirror 34 is at the screen projecting position, that is, it checks, with a position detection switch for the rotating mirror 34 that is not shown, whether or not the rotating mirror 34 is located in a position that does not obstruct the incidence from the first mirror 32 of the film projection light, and it proceeds to step C4 if the rotating mirror 34 is not in the screen projection position. In step C4, the rotating mirror motor 411 is rotated so as to move the rotating mirror 34 toward the screen projection position, and it proceeds to step C6. On the other hand, if the rotating mirror 34 is located in the screen projection position, it proceeds to step C5. In step C5, the rotating mirror motor 411 is turned off, the remote signals H and I of the light source control circuit 412 are turned on, and the light source 11 is lighted in the screen mode, and by setting the flag A to O, it proceeds to step C6. In step C6, it checks whether or not the flag B is set to 1, and it proceeds to step C14 if it is not set to 1 while it proceeds to step C7 if it is set to 1. In step C7, the remote signals H, I, and J of the light source control circuit 412 are turned off and the light source 11 is turned off, to proceed to step C8. In step C8, it is checked whether or not the rotating mirror 34 is in the printing position, that is, it is checked whether or not the rotating mirror 34 is above of the lens holder unit 21, by means of a position detection switch for the rotating mirror 34 that is not shown, and it proceeds to step C9 if the rotating mirror 34 is not in the printing position. In step C9, the rotating mirror 34 is rotated so as to move it toward the printing position, and it proceeds to step C14. On the other hand, if the rotating mirror 34 is in the printing position in step C8, the rotating mirror motor 411 is turned off to proceed to step C11. In step C11, it is checked whether or not the second developing apparatus is selected, and it proceeds to step C12 if the second developing apparatus is selected while it proceeds to step C13 skipping step C12 if the second developing apparatus is not selected. In step C12, the remote signal J of the light source control circuit 412 is turned on, the shutter solenoid 361 is turned on, and the scanning light path above the photosensitive body 107 is shielded, to proceed to step C13. In step C13, the remote signal H of the light source control circuit 412 is turned on, the light source 11 is lighted in the P - P or N - P mode, and further, the flag B is set to 0, to proceed to step C14. In step C14, it is checked whether or not it is in the standby condition, and it proceeds to step C15 if it is in the standby condition. In step C15, it is checked whether or not the standby key on the operating panel 2 is turned on, and it proceeds to step C16 if it is in the on-state. In step C16, it is checked whether or not the light source 11 is lighted, and if it is found lighted, in step C17, the remote signals H, I, and J of the light source control circuit 412 are turned off, the light source is turned off, and further, turns off all of the displays 353 on the operating panel 2, completing the interruption processing. Further, if the light source 11 is not lighted in step C16, it proceeds to step C18. In step C18, it is checked whether or not the N - P development should be given priority. If the N - P development is to be given priority, it proceeds to step C19 to select the second developing apparatus, and if the N - P development is not to be given priority, it proceeds to step C20 to select the first developing apparatus, and in each case it proceeds to step C21. In step C21, the remote signals H and I of the light source control circuit 412 are turned on and the light source 11 is lighted in the screen mode, completing the interruption processing. On the other hand, when it is not in the standby condition in step C14 and when the standby key 356 is not pressed down in step C15, the interruption processing is completed.

Next, the operation of the microfilm reader/printer as a whole will be described briefly.

In projecting a film, first, the grip section 13 of FIG. 2 is pulled toward the front, and the microfilm is set between the transparent plates 3A and 3B by opening the upper transparent plate 3A of the pressing plates 3. Next, the main switch 358 on the operating panel 2 is pressed down to light the light source 11 for projection. Then, it becomes possible to visualize the enlarged image of the microfilm 5. In addition, focus adjustment is carried out by operating to turn the vanes 27A of the focus adjusting member 27, and positioning of the projected image is carried out by moving the grip section 13 in back and forth and in right and left directions while watching the projection screen 1 and the coordinates on the front panel 322 that is indicated by the pointer 14. In addition, depending upon the need, rotation of the projected image on the projection screen can be done with ease by operating to turn the projected image rotation adjustment gear 28.

Next, the operation for printing the enlarged image of the microfilm 5 on a paper P in the paper feeding cassette 4 will be described. In this case, when the print holding display appears on the display board 353 on the operating panel 2, the light source 11 is turned off by setting the standby key 356 to on-state, and it waits until the heater in the image formation unit 100 is warmed up. During this period, a button which is not shown is pressed down to move the rotating mirror 34 in the direction from the rear surface to the front surface of FIG. 2, and the rotating mirror 34 is set to be above the lens holder unit 21. When the heater is warmed up completely and the print enable display shows up on the display board, the standby key 356 is turned off. Next, either one of the P - P selection key or the N - P selection key is selected to fit the type of the microfilm. Then, the number of prints is selected by the print number setting key 354, and is the printing operation started by pressing down the print start key 357. By these arrangements, the projected light is scanned by the rotating mirror 34 that is rotated synchronized with the rotating drive of the photosensitive body 107, and is irradiated upon the photosensitive body 107 via the scanning light guiding unit 50.

On the other hand, the photosensitive body 107 is charged in a prescribed way by the charger for charging 108 in response to the P→P development or N→P development, and there is formed electrostatic latent image based on the scanning light. Then, when the photosensitive body 107 arrives at the position that faces the developing device 110, a positive developer image is formed by the first developing apparatus $132_1$ for a latent image based on a positively recorded microfilm, and a positive developer image is formed by the second developing apparatus $132_2$ for a latent image based on a negatively recorded microfilm. After that, the developer image is transferred onto the paper P by the charger for transfer 111 in response to P→P development or N→P development, and later it is detached from the photosensitive body 107 by means of the charger for detachment 112. Then, the paper P is led through the paper transporting route 117 to the heat rollers 119 where the transferred image is fixed by melting, and is ejected by the paper ejecting rollers 119 to the tray for ejected papers 104. On the other hand, the residual toner that remains on the photosensitive body 107 is cleaned by the cleaning device 113, and further, the residual image on the photosensitive body 107 is eliminated by the charge removing lamp 114, to prepare for the next copying operation. In addition, if there occurs jamming of paper while the paper is on the paper transporting route 117, it can be detected by the operator by means of the paper jamming display on the operating loard 353. By opening the first side panel 326 and by turning the upper frame 102 with the supporting axis 103A as the center, the operator can readily remove the paper P that is on the paper transporting route 117.

It should be mentioned that the present invention is not limited to the embodiment described in the foregoing and various modifications will become possible within the scope of the present invention. Thus, for instance, in the power saving mode described in connection with FIG. 17 (C) may be chosen not only to set the light source lamp to the off-state but also to keep the temperature for the heater lamp at a constant temperature which is below the temperature at which fixing becomes possible, as its set temperature in the power saving mode is shown in FIG. 16 (B).

What is claimed is:

1. A record reader/printer, comprising:
   a light source device for irradiating a record with a projection light to obtain image information recorded in the record;
   projecting means for using said projection light to project an image of said image information recorded in the record to display the image;
   means, responsive to said projecting means, for forming a latent image on an image bearing member according to the image information;
   means for developing the latent image on the image bearing member;
   means for transferring the developed image on the image bearing member to a recording medium;
   heating means for heating the developed image on the recording medium to a predetermined fixing temperature to form a fixed image on the recording medium;
   print number setting means for setting and storing a set number of prints to be printed; and
   operating means for
   (a) selecting one of a power saving mode and a non-power saving mode,
   (b) when the power saving mode is selected, maintaining said predetermined number of prints and controlling said light source device to be non-operative and controlling said heating means to be at a temperature lower than the predetermined fixing temperature, and
   (c) when the non-power saving mode is selected:
   (1) controlling the light source to be operative,
   (2) controlling the heating means to be at the predetermined fixed temperature, (3) determining if a predetermined time is elapsed without forming an image on the recording medium, and
   (4) resetting the set number of the prints to a predetermined number when said predetermined time is elapsed.

2. The record reader/printer of claim 1, wherein said operating means includes means for activating the developing means, the transferring means, and the heating means to carry out printing.

3. The record reader/printer of claim 1, wherein the operating means comprises a stand-by key.

4. The record reader/printer of claim 1, further comprising means for specifying one image formation mode out of a plurality of image formation modes in accordance with the image information recorded in the record.

5. The record reader/printer of claim 1, further comprising means for specifying one image formation mode out of several image formation modes in accordance with the image information recorded in the record, wherein the operating means also supplies a control signal to the scanning means and the developing means so as to hold the specified image formation mode until another image formation mode is specified.

6. The record reader/printer of claim 5, wherein the image formation mode specifying means comprises a N - P development selection key and a P - P development selection key for selecting an N - P image formation mode to form a positive image from a negative image recorded in the record and a P - P image formation mode to form a positive image from a positive image recorded in the record, respectively.

7. A record reader/printer, comprising:
   a light source device for irradiating a record with a projection light to obtain image information recorded in the record;
   projecting means for using said projection light to project an image of said image formation recorded in the record to display the image;
   means, responsive to said projecting means, for forming a latent image on an image bearing member according to the image formation;
   means for developing the latent image on the image bearing member;
   means for transferring the developed image on the image bearing member to a recording medium;
   heating means for heating the developed image on the recording medium to a predetermined fixing temperature to form a fixed image on the recording medium;
   print number setting means for setting a set number of prints to be printed and for saving said set number, so that said set number of prints is printed each time a printing operation is commanded;
   means for selecting one of a power saving mode in which said light source device is off and said heating means has a lowered fixing temperature, and a non-power saving mode in which said light source is on and said heating means is at said predetermined fixing temperature; and
   means for determining when a predetermined time is elapsed without the forming of the image on the recording medium and when a continuous image forming is completed in accordance with the set number of prints and for resetting the set number of prints to one when said predetermined time is elapsed when said determination is made by said determining means, only in said non-power saving mode and not in said power saving mode.

8. A record reader/printer, comprising:
   a light source device for irradiating a record with a projection light to obtain image information recorded in the record;
   projecting means for using said projection light to project an image of said image formation recorded in the record to display the image;
   means, responsive to said projecting means, for forming a latent image on an image bearing member according to the image information;
   means for developing the latent image on the image bearing member;
   means for transferring the developed image on the image bearing member to a recording medium;

heating means for heating the developed image on the recording medium to a predetermined fixing temperature to form a fixed image on the recording medium;

print number setting means for setting a set number of prints to be printed and for saving said set number, so that said set number of prints is printed each time a printing operation is commanded;

means for selecting one of a power saving mode in which said light source device is off and said heating means is lowered, and a non-power saving mode in which said light source is on and said heating means is at said predetermined fixing temperature;

means for specifying one image formation mode out of a plurality of image formation modes in accordance with the image formation recorded in the record; and means for resetting the set number of prints to a predetermined number and for holding the specified image formation mode when a predetermined time is elapsed in the non-power saving mode without a forming of the image on the recording medium and not resetting in the power saving mode.

* * * * *